United States Patent
Cho et al.

(10) Patent No.: US 9,130,958 B2
(45) Date of Patent: Sep. 8, 2015

(54) TERMINAL, SEED SERVER, AND TRACKER SERVER FOR REDUCING DELAY IN STREAMING SERVICE

(75) Inventors: Joon-Ho Cho, Suwon-si (KR); Seong-Ho Cho, Seoul (KR); Sung-Jae Shin, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 12/845,318

(22) Filed: Jul. 28, 2010

(65) Prior Publication Data

US 2011/0060798 A1 Mar. 10, 2011

(30) Foreign Application Priority Data

Sep. 7, 2009 (KR) .................. 10-2009-0084016

(51) Int. Cl.
*G06F 15/16* (2006.01)
*H04L 29/08* (2006.01)
*H04L 29/06* (2006.01)

(52) U.S. Cl.
CPC .......... *H04L 67/104* (2013.01); *H04L 65/4084* (2013.01); *H04L 67/1031* (2013.01); *H04L 67/2833* (2013.01)

(58) Field of Classification Search
CPC ................ G06F 15/16; G06F 15/173
USPC ........................................ 709/206
See application file for complete search history.

(56) References Cited

U.S. PATENT DOCUMENTS

| 8,180,853 | B2 | 5/2012 | Lee et al. |
| 2008/0133767 | A1* | 6/2008 | Birrer et al. ............ 709/231 |
| 2009/0164656 | A1 | 6/2009 | Guan |
| 2009/0172172 | A1* | 7/2009 | Graham et al. ............ 709/227 |

FOREIGN PATENT DOCUMENTS

| KR | 10-2008-0093313 A | 10/2008 |
| KR | 10-2008-0094174 | 10/2008 |
| KR | 10-2008-0107472 | 12/2008 |
| WO | WO 2005/046168 | 5/2005 |

OTHER PUBLICATIONS

Li et al, "Inside the New Coolstreaming: Princicples, Measurements and Performance Implications," In Proceedings of the IEEE $27^{th}$ Conference on Computer Communications (INFOCOM 2008), 2008, Phoenix, Arizona, USA, pp. 1031-1039.

(Continued)

*Primary Examiner* — Joseph Greene
(74) *Attorney, Agent, or Firm* — NSIP Law

(57) ABSTRACT

A P2P network system for reducing streaming delay in a peer-to-peer (P2P) network is provided. The P2P network system may include at least one peer, a seed server, and a tracker server that manages the network. The seed server provides content to the at least one peer. The peer, the seed server, and the tracker server operate such that the P2P network is managed based on the distance of each peer from the seed server.

16 Claims, 33 Drawing Sheets

(56) References Cited

OTHER PUBLICATIONS

Zhang et al, "Understanding the Power of Pull-based Streaming Protocol: Can We Do Better?" *IEEE Journal on Selected Areas in Communications*, Dec. 2007, vol. 25, Issue 9, pp. 1678-1694.

Korean Office Action issued on Apr. 30, 2015 for the corresponding Korean Patent Application No. 10-2009-0084016 (English translation pp. 1-2; Korean Office Action pp. 3-6).

* cited by examiner

| HOP COUNT OF P1 | |
|---|---|
| All | {4,5,5,6} |
| Min | 4 |
| Max | 6 |
| Avg. | 5 |

FIG.6C

Seed ID:Server 1
Peer IP:x.x.x.x
Dist type:HopCount
Dist value type:Avg
Dist value:10.3
Up capacity:5
Target dist type:HopeCount
Target dist value type:Avg
Target dist value:8.0
Est. Num of Peers:1000
Est.Avg.Up capacity:3.5
......

Avg.hop = 2.1
Max hop = 4

FIG.10C

Seed ID:Server 1
Peer IP:x.x.x.x
Dist type:HopCount
Dist value type:Avg
Dist value:10.3
Up capacity:5

| Seed ID | Seed IP | Distance type | Radius limit value |

FIG.14B

```
12:JoinResponse
d
7:Server1
1
19:217.104.37.168:8001
8:HopCount
i10e
e
e
...
```

FIG.14C

```
<JoinResponse>
  <SeedList>
    <Seed>
      <Id> Server1 </Id>
      <Addr> 217.104.37.168:8001</Addr>
      <Radius>
        <DistanceType> HopCount </DistanceType>
        <RadiusLimitValue> 10 </RadiusLimitValue>
      </Radius>
    </Seed>
  </Seedlist>
  ...
</JoinResponse>
```

FIG.15A

| Seed ID | Peer ID | Distance type | Distance value type | Distance value(s) |
|---|---|---|---|---|
| Uplink capacity | | Target distance type | Target distance value type | |
| Target distance value | | Est.Num of Peers | Est.Avg.Up Capacity | |

FIG.15B

```
17:MembershipRequest
7:Server1
19:217.104.37.168:8001
8:HopCount
d
3:Avg
4:10.4
e
i5e
8:HopCount
3:Avg
i1000e
3:3.5
...
```

FIG.15C

```
<MembershipRequest>
  <seed>
    <Id> Server1 </Id>
  </Seed>
  <Peer>
    <Addr> 217.104.37.168:8001</Addr>
  </Peer>
  <Distance>
    <DistanceType> HopCount </DistanceType>
    <DistanceValueList type=list>
      <DistanceValueType> Avg </DistanceValueType>
         <DistanceValue> 10.3 </DistanceValue>
    </DistanceValueList>
  </Distance>
  <UplinkCapacity> 5 </UplinkCapacity>
  <TargetLevel>
    <DistanceType> HopCount </DistanceType>
    <DistanceValueType> Avg </DistanceValueType>
    <DistanceValue> 7.6 </DistanceValue>
  </TargetLevel>
  <Estimation>
    <NumberOfPeers> 1000 </NumberOfPeers>
    <AvgUplinkCapacity> 3.5 </AvgUplinkCapacity>
  </Estimation>
   ......
</MemvershipRequest>
```

FIG.16A

| Seed ID | Peer IP | Distance type | Distance value type | Distance value(s) | Uplink capacity |

FIG.16B

```
10:PeerReport
7:Server1
19:217.104.37.168:8001
8:HopCount
d
3:Avg
4:10.4
e
i5e
```

FIG.16C

```
<PeerReport>
  <Seed>
    <Id> Server1 </Id>
  </Seed>
  <Peer>
    <Addr> 217.104.37.168:8001 </Addr>
  </Peer>
  <Distance>
    <DistanceType> HopCount </DistanceType>
    <DistanceValueList type=list>
      <DistanceValueType> Avg </DistanceValueType>
      <DistanceValue> 10.3 </DistanceValue>
    </DistanceValueList>
  </Distance>
  <UplinkCapacity> 5 </UplinkCapacity>
</PeerReport>
```

FIG.17A

| Num of Peers | Avg Up Capacity | Target Peer IP |
|---|---|---|
| Percentile Rank | Distance type | Distance value type |
| Distance value(s) | | |

FIG.17B

```
13:SummaryReport
i1000e
3:3.5
19:217.104.37.168:8001
2:38
8:HopCount
3:Avg
3:7.6
```

FIG.17C

```
<SummaryReport>
  <Summary>
    <NumberOfPeers> 1000 </NumberOfPeers>
    <AvgUplinkCapacity> 3.5 </AvgUplinkCapacity>
  </Summary>
  <TargetPeer>
    <Addr> 217.104.37.168:8001 </Addr>
  </TargetPeer>
  <TargetLevel>
    <PercentileRank> 38 </PercentileRank>
    <DistanceType> HopCount </DistanceType>
    <DistanceValueType> Avg </DistanceValueType>
    <DistanceValue> 7.6 </DistanceValue>
  </TargetLevel>
</SummaryReport>
```

FIG.18A

| Old Seed ID | New Seed ID | New Seed IP | Split ratio |

FIG.18B

17:SplitNotification
7:Server1
7:Server2
19:217.104.39.233:8001
3:0.5

FIG.18C

```
<SplitNotification>
  <Oldseed>
    <Id> Server1 </Id>
  </OldSeed>
  <NewSeed>
    <Id> Server2 </Id>
    <Addr> 217.104.39.233:8001 </Addr>
  </NewSeed>
  <SplitRatio> 0.5 </SplitRatio>
</SplitNotification>
```

FIG.18D

| Old Seed ID | New Seed ID | New Seed IP | Move ratio | Split Ratio |
| --- | --- | --- | --- | --- |

FIG.18E

```
17:SplitNotification
7:Server1
7:Server2
19:217.104.39.233:8001
3:0.5
3:0.5
```

FIG.18F

```
<SplitNotification>
   <OldSeed>
      <Id> Server1 </Id>
   </OldSeed>
   <NewSeed>
      <Id> Server2 </Id>
      <Addr> 217.104.39.233:8001 </Addr>
   </NewSeed>
   <MoveRatio> 0.5 </MoveRatio>
   <SplitRatio> 0.5 </SplitRatio>
</SplitNotification>
```

FIG.19A

| Old Seed ID | New Seed ID | New Seed IP | Deadline |
|---|---|---|---|

FIG.19B

```
17:MergeNotification
7:Server1
7:Server2
19:217.104.39.233:8001
i60e
```

FIG.19C

```
<MergeNotification>
  <OldSeed>
    <Id> Server1 </Id>
  </OldSeed>
  <NewSeed>
    <Id> Server2 </Id>
    <Addr> 217.104.39.233:8001 </Addr>
  </NewSeed>
  <Deadline> 60 </Deadline>
</MergeNotification>
```

TERMINAL, SEED SERVER, AND TRACKER SERVER FOR REDUCING DELAY IN STREAMING SERVICE

CROSS-REFERENCE TO RELATED APPLICATION(S)

This application claims the benefit under 35 U.S.C. §119 (a) of Korean Patent Application No. 10-2009-0084016, filed on Sep. 7, 2009, the entire disclosure of which is incorporated herein by reference for all purposes.

BACKGROUND

1. Field

The following description relates to a streaming technology in a peer-to-peer (P2P) network, and more particularly, to a system for reducing streaming delay in a P2P network.

2. Description of the Related Art

Streaming technology may be used to play images, sound, animation files, and the like, in real time on the Internet, instead of downloading the entire file to a hard disk drive and then playing the file. When streaming data, before a file is completely transmitted, a user's browser or plug-in program begins to execute the data. Accordingly, the time it takes for the file to begin playing is reduced and the capacity of the hard drive is not substantially affected.

With the development of peer-to-peer (P2P) technology, P2P-based streaming services have become popular such as PPLIVE® and PPStream. In a P2P network for the streaming service, a user node may operate as a server to provide contents by sharing the load of a contents providing server. In doing so, the user node lightens the resource burden of the contents providing server. Even when a large number of users simultaneously use the service, for example, when an international sports match or a presidential inauguration are broadcast through the streaming service, the streaming service can be sufficiently provided without overextending a system. The streaming service using P2P technology can reduce costs for service providers and provides low service charge and a high quality of experience (QoE) for users.

However, the streaming service using P2P technology does not guarantee quality of service. For example, a transmission delay that effects real-time streaming characteristics, that are critical in live broadcasts, needs to be resolved for P2P streaming technology. The time at which a user plays a specific location of content is determined by adding the transmission time to the time at which the server transmits a content portion at the location. This difference in playing time due to transmission is called a transmission delay time. The transmission delay is severe in the P2P streaming technology because the P2P network has a structure that increases the delay due to content packets being iteratively stored and transferred via several hops, unlike a server-client model in which contents are directly received from a server.

SUMMARY

In one general aspect, there is provided a terminal, comprising: a distance processor configured to measure a distance to a seed server that provides contents to the terminal via a network; a message generator configured to generate a network join request message and a peer report message, the peer report message comprising information on the distance to the seed server; a message transmitter configured to: transmit the join request message to the seed server; and transmit the peer report message to the seed server or a tracker server; and a message receiver configured to: receive, from the seed server, a join response message comprising previously set limit distance information for the network; and process the join response message.

The terminal may further include that the message generator is further configured to: generate the peer report message periodically or when the distance from the seed server exceeds the limit distance; and control the message transmitter to deliver the peer report message.

The terminal may further include: an uplink channel measurer configured to measure available capacity of an uplink channel of the terminal, wherein the message generator is further configured to generate the peer report message to additionally comprise information on the measured capacity of the uplink channel.

The terminal may further include: a membership manager configured to manage a peer list; and a partnership manager configured to manage partnership with other terminals included in the peer list.

The terminal may further include that the distance processor is further configured to: acquire a target distance determined by collecting a peer report message from the tracker server; compare a current distance from the seed server with the target distance; and in response to the current distance being different from the target distance, control the partnership manager to replace a partnership with one of the other peers such that the current distance is updated and is closer to the target distance.

The terminal may further include that, in response to the current distance not being equal to or smaller than the target distance after the partnership replacement, the distance processor is further configured to control the membership manager to replace another membership with one of the other peers such that the current distance is equal to or smaller than the target distance.

The terminal may further include that: the message generator is further configured to generate a membership request message to gain membership with at least one other terminal under control of the membership manager; the message receiver is further configured to receive a membership response message from the other terminal and processes the membership response message; and the membership request message and the membership response message each comprise at least one of: an ID of the seed server, an IP address of the terminal, current distance information, target distance information, and overall network prediction information.

The terminal may further include that the current distance information comprises at least one of: a current distance type, a current distance representation scheme, and a current distance value, the target distance information comprises at least one of: a target distance type, a target distance representation scheme, and a target distance value, and the overall network prediction information comprises at least one of: the number of terminals that have joined the network and an average capacity of an uplink channel of the overall network.

The terminal may further include that in response to the network being managed according to gossip-based protocol, the distance processor is further configured to: infer the target distance from the seed server using information included in the membership response message; compare a current distance from the seed server with the target distance; and in response to the current distance being different from the target distance, control the partnership manager to replace a partnership with one or more other peers such that the difference between the current distance and the target distance is closer to the target distance.

The terminal may further include that, in response to the current distance not being equal to or smaller than the target distance after the partnership replacement, the distance processor is further configured to control the membership manager to replace another membership with one or more of the other peers such that the current distance is equal to or smaller than the target distance.

The terminal may further include that, in response to the distance of the terminal from the seed server exceeding the previously set limit distance, the distance processor is further configured to control the membership manager to change a membership by replacing at least one neighboring membership terminal with at least one terminal closer to the seed server.

The terminal may further include that: the message receiver is further configured to receive, from a tracker server, a split notification message comprising at least one of: an ID of an old seed server, an ID of a new seed server, an IP address of the new seed server, and a ratio of membership terminals between an old network and a new network; and the message receiver is further configured to process the split notification message.

The terminal may further include that the distance processor is further configured to operate such that the terminal is configured to: disconnect from the old seed server using information included in the split notification message; and move to a network comprising the new seed server.

The terminal may further include that the message receiver is further configured to receive a split notification message comprising at least one of: an ID of an old seed server, an ID of a new seed server, an IP address of the new seed server, a ratio of terminals to be moved, and a split ratio, through gossip protocol.

The terminal may further include that the distance processor is further configured to determine whether the terminal moves to the network comprising the new seed server using information included in the split notification message.

The terminal may further include that the message receiver is further configured to receive, from the tracker server or from another terminal, a merge notification message comprising at least one of: an ID of an old seed server, an ID of a new seed server, an IP address of the new seed server, and a deadline, through gossip protocol.

The terminal may further include that the distance processor is further configured to operate such that the terminal is configured to: disconnect from the old seed server; and move to a network comprising the new seed server, using information included in the merge notification message.

In another general aspect, there is provided a seed server, comprising: a message receiver configured to collect a peer report message comprising information on a distance from at least one terminal; a topology manager configured to generate a network management message according to the distance information; and a message transmitter configured to transmit the network management message to the at least one terminal.

The seed server may further include that: the message generator is further configured to generate a join response message in response to a request from a new terminal to join a network comprising the seed server; the message transmitter is further configured to deliver the generated join response message to the new terminal; and the join response message comprises at least one of: an ID of the seed server, an IP address of the seed server, a type of a distance value, and limit distance information.

The seed server may further include that the topology manager is further configured to: determine a network split to comprise a new seed server in the network; and cause: a new terminal to join the new seed server; or the at least one terminal to join the network comprising the new seed server.

The seed server may further include that the topology manager is further configured to perform one of: a complete split operation causing the at least one terminal to disconnect from an old seed server, cancel membership with at least one other terminal, and move to a new network comprising a new seed server; or a mixing split operation causing the at least one terminal to disconnect from the old seed server, move to the new network comprising the new seed server, and gain membership with terminals belonging to the old network and terminals belonging to the new network according to a previously set ratio.

The seed server may further include that, in response to the number of peer report messages received from terminals, indicating that the distance from the seed server to the respective terminal exceeds the limit distance, being equal to or greater than a predetermined number, the topology manager is further configured to determine the network split.

The seed server may further include that: the topology manager is further configured to control the message transmitter to flood a split notification message as a network management message to other terminals through gossip protocol in order to perform the other terminals of the network split; and the split notification message comprises at least one of: an ID of an old seed server, an ID of a new seed server, an IP address of the new seed server, a split ratio, and a ratio of terminals to be moved.

The seed server may further include that the topology manager is further configured to determine a network merge to remove at least one seed server from the network and to cause the terminals joined to the removed seed server to join a network comprising other non-removed seed servers.

The seed server may further include that, in response to the number of peer report messages received from terminals, indicating that the distance from the respective terminal to the seed server is equal to or smaller than a previously set minimum distance, being equal to or greater than a predetermined number, the topology manager is further configured to determine the network merge.

The seed server may further include that: the topology manager is further configured to control the message transmitter to flood a merge notification message as a network management message to other terminals through gossip protocol in order to perform the other terminals of the network merge; and the merge notification message comprises at least one of: an ID of an old seed server, an ID of a new seed server, an IP address of the new seed server, and a deadline.

In another general aspect, there is provided a tracker server, comprising: a peer list manager configured to manage a peer list; a message receiver configured to receive a peer report message comprising current distance information and capacity information of an uplink channel from at least one terminal included in the peer list; a topology manager configured to: collect the received peer report message; and generate a network management message using the current distance information of at least one terminal and the capacity information of the uplink channel; and a message transmitter configured to transmit the generated message.

The tracker server may further include that: the topology manager is further configured to: generate a summary report message as a network management message using information included in the collected peer report message; and control the message transmitter to deliver the generated summary message to each terminal; and the summary report message comprises at least one of: summary information of an overall network, a percentile rank of a specific terminal according to a capacity of an uplink channel, and a target distance value of the specific terminal.

The tracker server may further include that the topology manager is further configured to: determine a network split to comprise a new seed server in the network; and cause: a new terminal to join the new seed server; or the at least one terminal to join the network comprising the new seed server.

The tracker server may further include that: the topology manager is further configured to: determine the network split; generate a split notification message as a network management message; and control the message transmitter to transmit the generated split notification message to the terminals to be moved to a new network; and the split notification message comprises at least one of: an ID of an old seed server, an ID of a new seed server, an IP address of the new seed server, and a split ratio.

The tracker server may further include that the topology manager is further configured to determine a network merge to remove at least one seed server from the network and to cause all terminals that have joined to the removed seed server to join a network comprising other non-removed seed servers.

The tracker server may further include that: in response to the topology manager determining the network merge, the topology manager is further configured to: generate a merge notification message as a network management message; and control the message transmitter to transmit the merge notification message to the terminals that have joined the network comprising the removed seed server; and the merge notification message comprises at least one of: an ID of an old seed server, an ID of a new seed server, an IP address of the new seed server, and a deadline.

Other features and aspects may be apparent from the following description, the drawings, and the claims.

BRIEF DESCRIPTION OF THE DRAWINGS

FIGS. 6A through 6C are diagrams illustrating examples of a membership process.

FIGS. 10A through 10C are diagrams illustrating examples of a delivery of a peer report message.

FIGS. 14A through 14C are diagrams illustrating examples of information included in a join response message.

FIGS. 15A through 15C are diagrams illustrating examples of information included in a membership message.

FIGS. 16A through 16C are diagrams illustrating examples of information included in a peer report message.

FIGS. 17A through 17C are diagrams illustrating examples of information included in a summary report message.

FIGS. 18A through 18F are diagrams illustrating examples of information included in a split notification message.

FIGS. 19A through 19C are diagrams illustrating examples of information included in a merge notification message.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
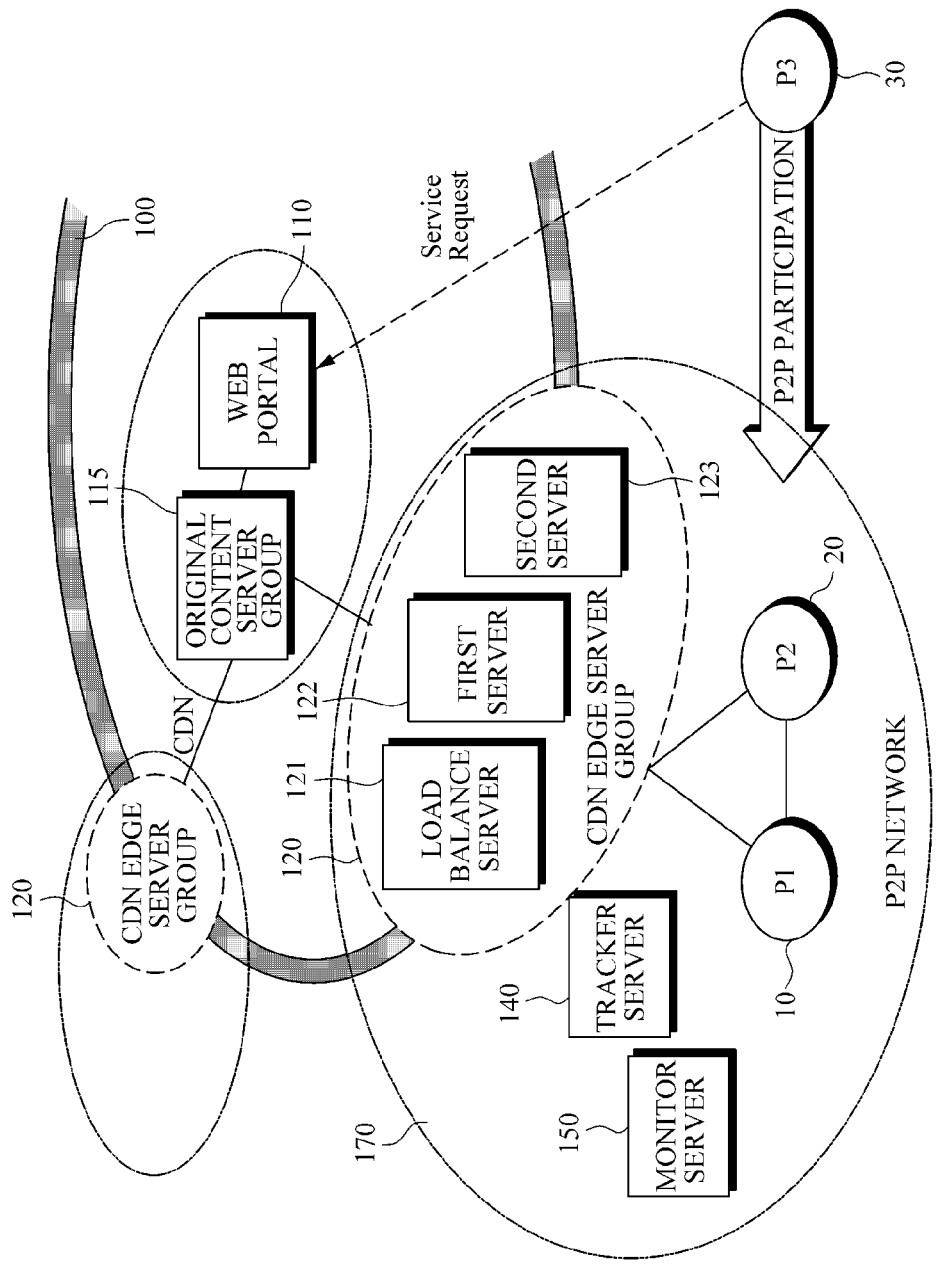
FIG. 1 is a diagram illustrating an example of a peer-to-peer (P2P) network.

FIG. 1 illustrates an example of a peer-to-peer (P2P) network. Referring to the example shown in FIG. 1, P2P network system 100 includes a web portal 110, an original content server group 115, a CDN edge server group 120, a tracker server 140, a monitor server 150, and a plurality of peers 10, 20, and 30. In this example, the peers 10, 20, and 30 are terminals that consume contents.

In the P2P network system 100, the original content server group 115 and one or more of the peers, for example, peers 10 and 20 may build a P2P network 170. In addition, the CDN edge server group 120 and one or more of the peers 10, 20, and 30, may build a P2P network 170. The peers 10, 20, and 30 may obtain data from the original content server group 115 or the CDN edge server group 120. Also, the peers 10, 20, and 30 may acquire content in a given time through data exchange between the peers.

The CDN edge server group 120 may be a server that receives content from the original content server group 115 and provides a streaming service to peers near the CDN edge server group 120. The CDN edge server group 120 may be selectively used. Accordingly, the use of the CDN edge server group 120 may increase the quality of service (QoS) and reduce the load of the original content server group 115 in providing the streaming service.

The CDN edge server group 120 may be a group of servers that are content sources and may include at least one seed server. As shown in FIG. 1, the CDN edge server group 120 may include a load balance server 121 that serves as front-end server, and a first server 122 and a second server 123 that serve as back-end servers. The load balance server 121 may receive a join request from the peers 10, 20, and 30. The load balance server 121 may support a connection between the peers 10, 20, and 30 and the back-end servers. Alternatively, the load balance server 121 may operate as a seed server that provides contents, like the back-end servers 122 and 123. The one load balance server 121 and two back-end servers 122 and 123 that are shown in FIG. 1 are merely for purposes of example. It should be understood that the type and number of servers in the CDN edge server group 120 are not limited to this example.

The load balance server 121 may distribute a load to the back-end servers 122 and 123. For example, when it is determined that it is going to be difficult to guarantee a QoS due to increase of the load, the load balance server 121 may increase the number of the back-end servers. In another example, when the load is decreased, the load balance server 121 may decrease the number of the back-end servers 122 and 123 to reduce costs. For convenience of illustration, in this example the first server 122 from among the seed servers provides contents while serving as the load balance server.

The web portal 110 may be used by the peers 10, 20, and 30 to search for the seed server, such as the first server 122. In some embodiments, when the peers 10, 20, and 30 are aware of an IP address of the first server 122 providing the P2P streaming service, the peers 10, 20, and 30 may access the first server 122 without the web portal 110.

The tracker server 140 may be used to manage the P2P network when the P2P network 170 is tracker-based, and may be selectively used according to various systems. The tracker server 140 has a list of peers that have joined streaming cooperation for each content. Accordingly, when peer 30 joins the P2P network, the tracker server 140 informs the peer 30 of a random peer list. Accordingly, the peer 30 may be connected to the P2P network 170 for the streaming service.

The monitor server 150 monitors the peers that have joined the P2P network system 100 and also monitors the state of the overall network. The monitor server 150 may be selectively used according to various systems. For convenience of illustration, in this example the tracker server 140 may serve as the monitor server 150.

In FIG. 1, it may be presumed that peer 10 and peer 20 are connected to the first server 122 that acts as a seed server, to receive the streaming service, and peer 30 desires to join the P2P network 170.

The peers that have joined the P2P network system 100 may receive content directly from the seed server such as the first server 122 and/or from other peers. The peers receiving the content from the first server 122 may be the peers 10 and 20 directly connected to the first server 122 or may be peers that are not connected directly to the first server 122. For example, the peers 10 and 20 may exchange their own content with each other, leading to content spread.

In most current services, the P2P network 170 that is configured by the peers is in the form of an unstructured mesh form P2P. In order to join the P2P network 170, the new peer 30 may access a seed server, for example, the first server 122 in the CDN edge server group 120. The new peer 30 may join the P2P network 170, as in a common P2P network. The first server 122 may inform the new peer 30 of a list of the other peers 10 and 20 that are already apart of the P2P network 170.

In this process, a variety of schemes may be used, for example, a tracker-based scheme and a gossip protocol-based scheme.

In the tracker-based scheme, the first server 122 informs the new peer 30 of an address of the tracker server 140. Peer 30 registers in the tracker server 140 using the address of the tracker server 140 and requests a peer list. The tracker server 140 is aware of all peers that have joined content streaming service. Accordingly, the tracker server 140 may randomly select peers from the peers that have joined the content streaming service and inform the selected peers of the peer list.

In the gossip protocol-based scheme, the first server 122 is aware of addresses of some of the peers, Accordingly, the first server 122 may randomly select one peer, for example, peer 20 to act as a deputy, and the first server 122 may inform the new peer 30 of the deputy peer 20. The new peer 30 may operate the gossip protocol, beginning with the deputy peer 20, to acquire information for any node that has joined the P2P network 170.

In some services, both the tracker and the gossip protocol may be used. In this example, the tracker server 140 is not aware of all the nodes that have joined the P2P network, but is aware of some of the nodes. Accordingly, the tracker may inform only some peers, and other peers must individually acquire information through the gossip protocol. This scheme that uses the tracker but that is not a complete centralization scheme, may be regarded as a pure gossip-based scheme. For convenience of illustration, a description of the example in which both the tracker and the gossip protocol are used is included in a description of the gossip-based scheme.

Using the peer list acquired by the tracker-based scheme or the gossip protocol-based scheme, peer 30 is able to gain membership with other peers 10 and 20 in the list. The list of members may be periodically updated using the tracker server 140 or through gossip.

Peer 30 may partner with some of the membership peers, which may be selected randomly or which may be selected by a specific peer selection algorithm. Other membership peers may be referred to as "neighboring peers" or "terminals." Accordingly, peer 30 may join the P2P network 170 and gain membership and/or a partnership with the other peers 10 and 20.

The partnership peers periodically exchange a buffer map between one another. The streaming content may be divided into segments of data. The buffer map may include information indicating ownership information for content owned by each peer. In live streaming, all peers in the network generally play data in substantially the same time zone. Generally, only data segment information played within a range of a few minutes from a current playing time may be indicated on the buffer map.

The peers may recognize the data segments owned by partnership peers by exchanging the buffer map with the partnership peers. If any one of partnership peers has a data segment that a specific peer does not have, the specific peer may request the data segment and store the data segment in the buffer.

Figure 2:
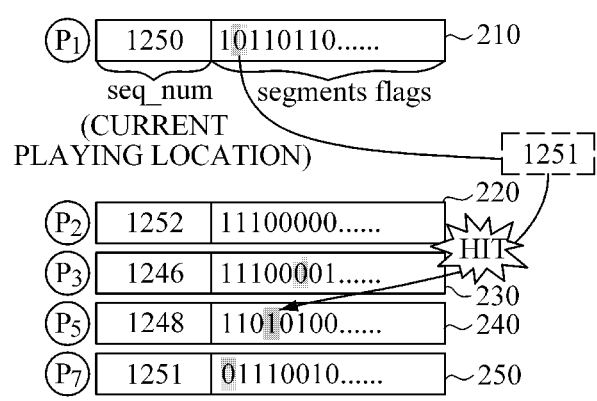
FIG. 2 is a diagram illustrating an example of an operation of searching for data using a buffer map.

FIG. 2 illustrates an example of an operation of searching for data using a buffer map.

Referring to FIG. 2, each of buffer maps 210, 220, 230, 240, and 250 may include a section (seq_num) indicating a current playing location and a section (segments flag) indicating whether a data segment subsequent to the playing location is obtained. For example, a bit may indicate whether each data segment is obtained. In this example, "1" indicates that the data segment has been obtained and "0" indicates that the data segment has not been obtained.

In the example shown in FIG. 2, the buffer map 210 of peer P1 shows that peer P1 is currently playing data segment 1250 and peer P1 has not obtained data segments 1251, 1254, and 1257.

Peer P2, peer P3, peer P5 and peer P7 may partner with peer P1. Accordingly, peer P1 may recognize that peer P5 has data segment 1251 by referring to the buffer maps 220, 230, 240 and 250 of the partnership peers. Accordingly, peer P1 may request peer P5 to provide the data segment 1251.

In some P2P live streaming systems, in order to guarantee a QoS, a non-obtained emergent data segment may be directly obtained from the seed server, for example, the first server 122 shown in FIG. 1. For example, although peer P1 has set the emergently necessary data segment 1251 as an emergent area, peer P1 may directly request the first server 122 to provide the emergent data segment when the other partnership peers do not have the data segment.

Referring back to FIG. 1, the P2P network system 100 may be used for PC-based moving-image streaming services. Also, the P2P network system 100 may be used for a CE based broadcast for streaming technology in a TV or a set-top box. For example, the P2P network system 100 may be used as transmission technology capable of reducing transmission cost while reliably streaming high-definition contents in an IP-based open Internet environment.

According to various embodiments, the P2P network configured by at least one peer may be managed based on the distance between at least one peer and a server to which the peer is connected.

For example, the P2P network 170 shown in FIG. 1 may be managed such that a peer having a relatively large uplink channel capacity (also referred to as a "bandwidth") is located closer to the seed server. The peer having a relatively large capacity may gain relatively more memberships and partnerships than other peers. Accordingly, the larger capacity peer may be arranged closer to the seed server, reducing an average delay time for the user nodes (clients or peers) in the P2P network.

The P2P network 170 may be managed, for example, such that the at least one peer connected to the seed server is located a distance that is equal to or smaller than a previously set limit distance. This may reduce a maximum delay time in the user nodes. Accordingly, the P2P network 170 may be managed in consideration of the maximum delay time, as well as an average delay time.

In the P2P network 170, the maximum distance between the seed server and the at least one peer is referred to as a "radius." Limiting the radius of the P2P network 170 to be equal to or smaller than a previously set limit distance limits the distance a data segment or a substream may move. A substream refers to a sequence of data segments. The move distance may be measured using a variety of methods, for example, using a hop count or a delay time.

If a new peer having a radius that exceeds the limit distance desires to join the P2P network 170, a new seed server may be allocated to the P2P network 170, thus increasing the total number of P2P networks 170. A peer redistribution process may be performed such that peer numbers between the new network and the old network are uniform.

Alternatively, the number of P2P networks 170 may be decreased. For example, when each of two seed servers has a small number of peers, for example, a number of peers equal to or smaller than a predetermined threshold, the number of seed servers may be reduced by inactivating one of the two seed servers, and causing the peers of the inactivated seed server to newly join another seed server included in the P2P network. Accordingly, the peers from the two servers may be merged to one server.

The distance from the seed server to each peer, which may be used for managing the P2P network 170, may be measured using a variety of criteria. For example, the distance information may be measured using a hop count or a delay time.

The distance may be calculated by adding a distance between a peer and a partner peer to a distance value of the partner peer. For example, if the distance value is measured by hop count, a delay time of a peer may be obtained by adding 1 to a hop count of an adjacent peer. If the distance value is measured by delay time, a delay time of a specific peer may be obtained by adding a measured delay time from an adjacent peer to the specific peer, to a delay time of the adjacent peer.

Figures 3A, 3B:
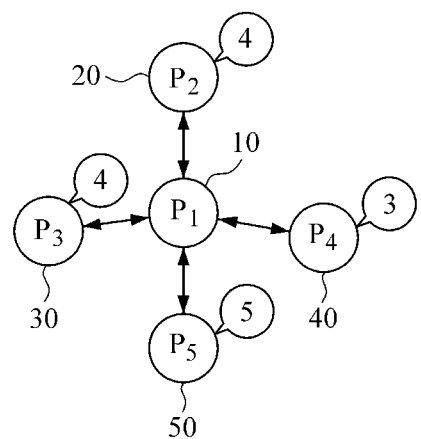
FIGS. 3A and 3B are diagrams illustrating examples of a process for representing the distance from a seed server.

FIGS. 3A and 3B illustrate examples of a process for representing a distance from a seed server.

Referring to FIG. 3A, peer P1 10 collects distance information from adjacent peers, for example, peer P2 20, peer P3 30, peer P4 40 and peer P5 50. In this example, a hop count may be used to measure a distance. In this example, the distance value of peer P2 20 is 4 hops, a distance value of peer P3 30 is 4 hops, a distance value of peer P4 40 is 3 hops, and a distance value of peer P5 50 is 5 hops, as shown in FIG. 3A. Peer P1 10 may calculate its own distance using the collected information.

There are various methods for calculating and representing a distance value. For example, the calculating and representing a distance value may include an "All" scheme in which the distance value of each peer is obtained by adding 1 to hop counts of each respective peer, a "Min" scheme in which 1 is added to a value of a peer having a minimum hop count, a "Max" scheme in which 1 is added to a value of a peer having a maximum hop count, and an "Avg" scheme in which the distance value is obtained by adding 1 to an average of the hop counts of all peers.

For example, peer P1 10 using the four schemes in FIG. 3A would generate hop counts of {4, 5, 5, 6} for the All scheme, "4" for the Min scheme, "6" for the Max scheme, and "5" for the Avg scheme, as shown in a table of FIG. 3B.

The distance value between the peer and the seed server may be used to limit the radius of the P2P network 170 and may be used as a reference value when the peers are efficiently arranged in the P2P network 170 through partnership replacement.

Figure 4:
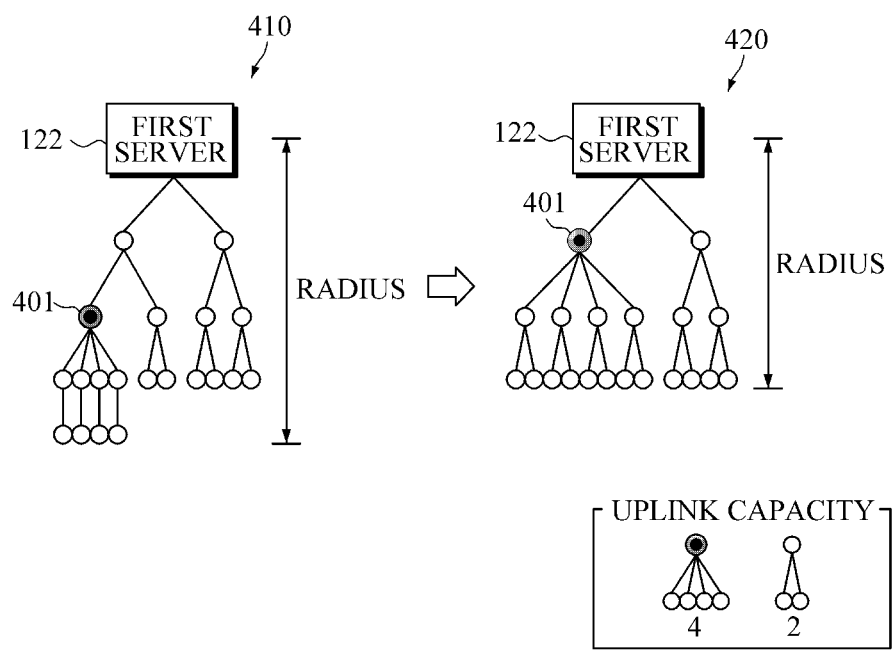
FIG. 4 is a diagram illustrating a peer arrangement operation for reducing a delay in a P2P network.

FIG. 4 illustrates a peer arrangement operation for reducing a delay in a P2P network.

According to various embodiments, the location of P2P peers in a network 410 may be changed through partnership replacement, reducing a delay in streaming. The peer may receive data segments from other peers and provide data segments to the other peers. However, individual peers may have different capabilities (Uplink Capacity) when providing data segments to other peers. Accordingly, the capability of the peer may depend on the time and the situation.

For example, a home network, such as a very high-data rate digital subscriber line (VDSL), an asymmetric digital subscriber line (ADSL), and a modem, may have different uplink/downlink capacities. In addition, some of the devices for a P2P network may exist in a network built in a home or company. For example, a user at home may navigate the Internet through a personal computer (PC) while viewing IP-based contents through a television (TV). Accordingly, the capacity of the uplink channel available to one device may be continuously affected by use of the uplink channel by another device. The processing capability of a device, as well as a network capacity, affects the capacity of the uplink channel.

Thus, the capability of a device differs from device to device. Accordingly, peers may have varying capacities, which may vary from moment to moment.

In addition, the total delay in the network may be affected by a distance from the seed server at which the peer is arranged.

In an example of a simple tree structure as in FIG. 4, when peer 401 having a large uplink capacity is moved from a P2P network 410 towards a seed server (e.g., a first server 122) as shown in the P2P network 420, the number of peers that exist within the same radius or at the same tree height may increase. For example, when a peer having a larger uplink capacity is arranged near the server, the radius of the network may be reduced. Accordingly, a total delay time of the network or an average delay time of the peer may be reduced.

In addition, the larger the capacity of the uplink channel the greater the performance of the P2P network. Therefore, a node making a great contribution to uplink capacity may be arranged near the first server 122, reducing delay time between the peers in the P2P network and the first server.

To arrange a peer near the server, a 2-step operation may be performed. For example, a first step may be to find a target distance corresponding to a current capacity of the uplink channel of the peer referred to as "peer leveling." A second step may be to change a relative location of the peer in the network until the peer reaches the target distance.

Figure 5:
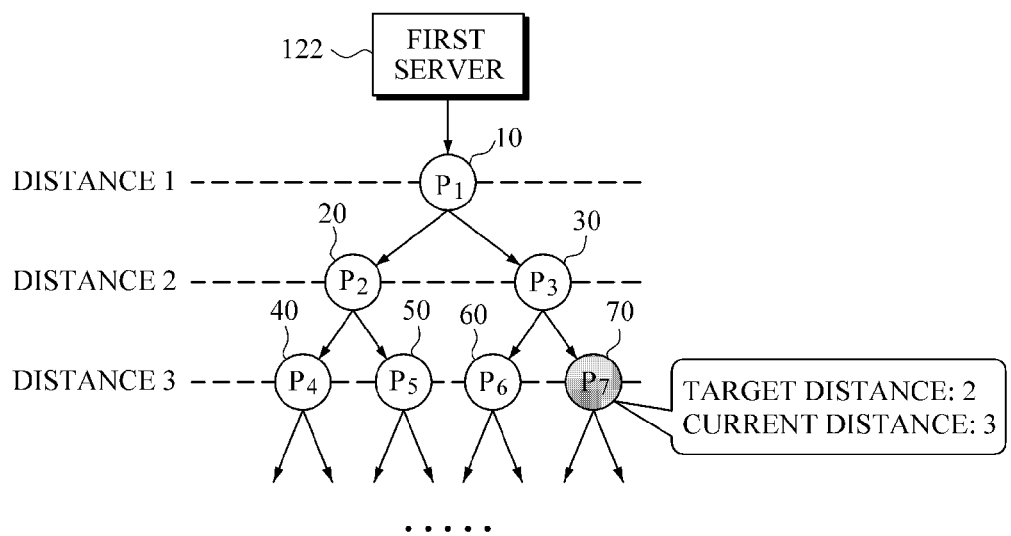
FIG. 5 is a diagram illustrating an example of a peer leveling operation.

FIG. 5 illustrates an example of a peer leveling operation.

Peer leveling is a process of obtaining a relative ranking or level of a specific peer relative to all nodes in the P2P network, based on an uplink capacity of the node. This level value may be used to measure a distance at which the peer must be located (a target distance value).

The process of peer leveling may differ according to the presence or absence of a tracker server.

Referring again to FIG. 1, the P2P network 170 is tracker-based and the tracker server 140 exists. The tracker server 140 may periodically collect information from peers and recognize the overall network performance. Accordingly, the tracker server 140 may obtain a level and a target distance value of the peers in the network and inform each peer of the level and the target distance value of the respective peer.

Figure 10A:
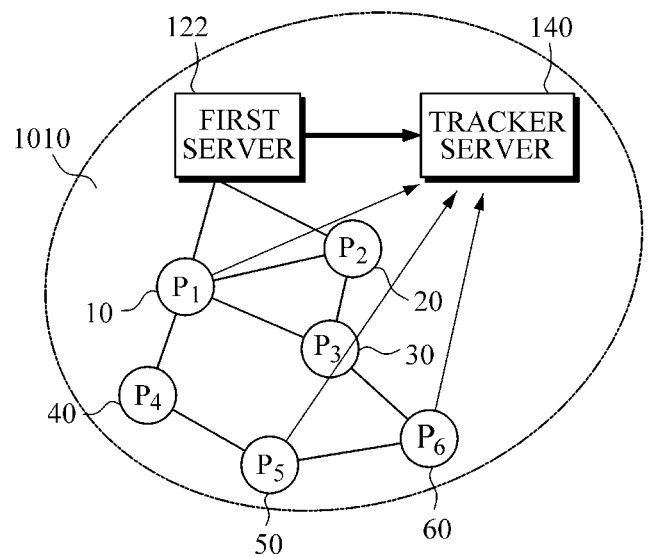

For example, the peers may periodically send a peer report message to the tracker server 140, as shown in FIG. 10A. The peer report message may include, for example, the capacity of the uplink channel of the peers (uplink capacitor), current distance information, and the like. Examples of the peer report message are further described with reference to FIGS. 10A through 10C and FIGS. 16A through 16C. After receiving the peer report messages from the peers, the tracker server 140 may calculate the levels of all the peers and target distance values suitable for the levels.

The tracker server 140 may analyze the peer report message received from at least one peer and provide summary network information in a summary report message to the peers. The summary report message may include, for example, information such as a percentile rank value of a specific peer based on the capacity of the uplink channel and a suitable target distance, together with summary information for the network such as a total number of peers and an average capacity of the uplink channel. The summary report message may be provided as a response to peers that have sent the peer report message, or may be provided to all the peers periodically.

Figure 6A:
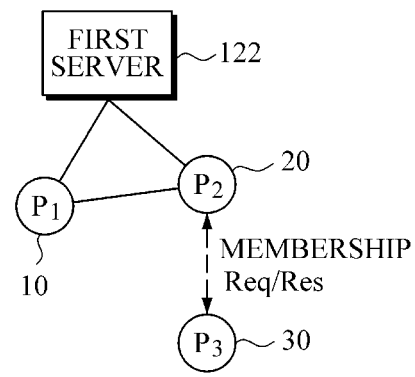
Figure 6B:
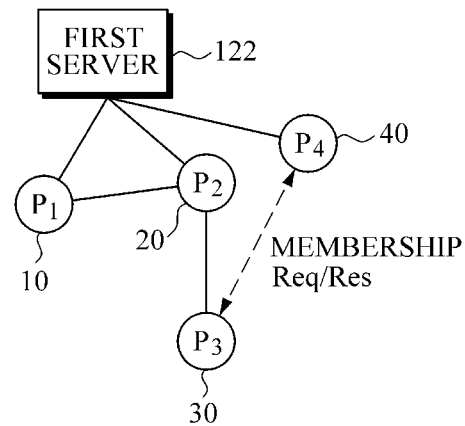

If the tracker server does not exist, peer leveling may be performed using the gossip-based membership protocol. As shown in FIGS. 6A and 6B, the membership protocol may be used when a peer joins the P2P network and when the peer periodically replaces a membership. This membership protocol may be used to obtain information on any peer in the network and gain membership with the peer. In this example, peer leveling may be performed by each peer inferring information of the network using information collected from other peers in the network.

FIGS. 6A through 6C illustrate examples of a membership process.

A membership process may be performed by transmission and reception of a membership message between peers. There are various kinds of membership messages, for example, a membership request message and a corresponding membership response message.

The membership process may be performed subsequent to a join process. For example, as shown in FIG. 6A, peer P3 30 desiring to join a P2P network may send a join request message to a first server 122. Upon receipt of a join response message from the first server 122, the peer P3 30 may transmit a membership request message to a peer that has joined the P2P network, for example, peer P2 20. Peer P3 30 may gain membership by receiving a membership response message from peer P2 20.

The membership process may also be performed for membership replacement, as shown in FIG. 6B. The membership replacement may be performed periodically. For example, in FIG. 6B, when peer P3 30 desires to replace membership from peer P2 20 to peer P4 40, peer P3 30 may gain membership with peer P4 40 by transmitting a membership request message to peer P4 40 and receiving a membership response message from peer P4 40.

When the network is tracker-based, the membership request message is sent to peers in the peer list informed by the tracker server. Alternatively, when the network is gossip protocol-based, the membership request message may be flooded to adjacent peer nodes using gossip protocol.

FIG. 6C illustrates an example of information that may be added to the membership request message and the membership response message used in the membership protocol. Current distance information and channel capacity information of a peer may be added to the message used in the membership protocol. For example, the current distance information may include a distance type (Dist type), a distance value type (Dist value type), and a distance value (Dist value).

Based on the current distance information, each peer may calculate a distance from the seed server. For example, if the type of distance value is a hop count, the peer may obtain its own hop count by adding 1 to a hop count of an adjacent peer. If the type of distance value is a delay time, the peer may obtain its own delay time by determining a delay time value measured from the peer and adjacent peers, and adding that delay time to a delay time value of the adjacent peers.

Each peer may estimate information of the overall network and target distance information of the peer through estimation schemes, such as regression. Each peer may use information of other peers acquired through the membership protocol. For example, the overall network information may include a total peer number (Est. Num of Peers) and a total capacity of an uplink channel (Est. Avg. Up). For example, the target distance information may include a target distance type (Target dist type), a target distance value type (Target dist value type), and a target distance value (Target dist value).

When the membership protocol is continuously run, information collected from the other peers may accumulate over time. Accordingly, the result of the estimation may gradually improve as more information is collected. To increase the accuracy of the estimation, the respective peers may send and receive estimation values obtained by the peers to and from each other, in addition to the above-described information. A peer receiving the estimation values from other peers may reflect the received estimation values in its own estimation process.

Through the determination or estimation of the target distance of the peer as described above, peer P7 70 (as shown in FIG. 5) may determine that a target distance from the first server 122 is 2 hops and the actual current distance is 3 hops.

Subsequent to peer leveling, the peers may replace partnership in order to reach the target distance value. The peers may replace partnership according to a need or periodically. However, because most replacements are performed randomly, there is no particular rule needed for the partnership replacement. Partnership refers to a peer being connected with another peer along a link. For example, the link may be a link that runs from an outer peer to the seed server. For example, the link may be directly between the outer peer and the seed server, or the link may travel from the outer peer through one or more intermediate nodes to the seed server.

Because the partnership replacement is used for the peer to reach the target distance value, an algorithm for selecting the most suitable peers from among membership peers may be employed. In this process, unnecessary peers are replaced with new partner peers.

Figure 7:
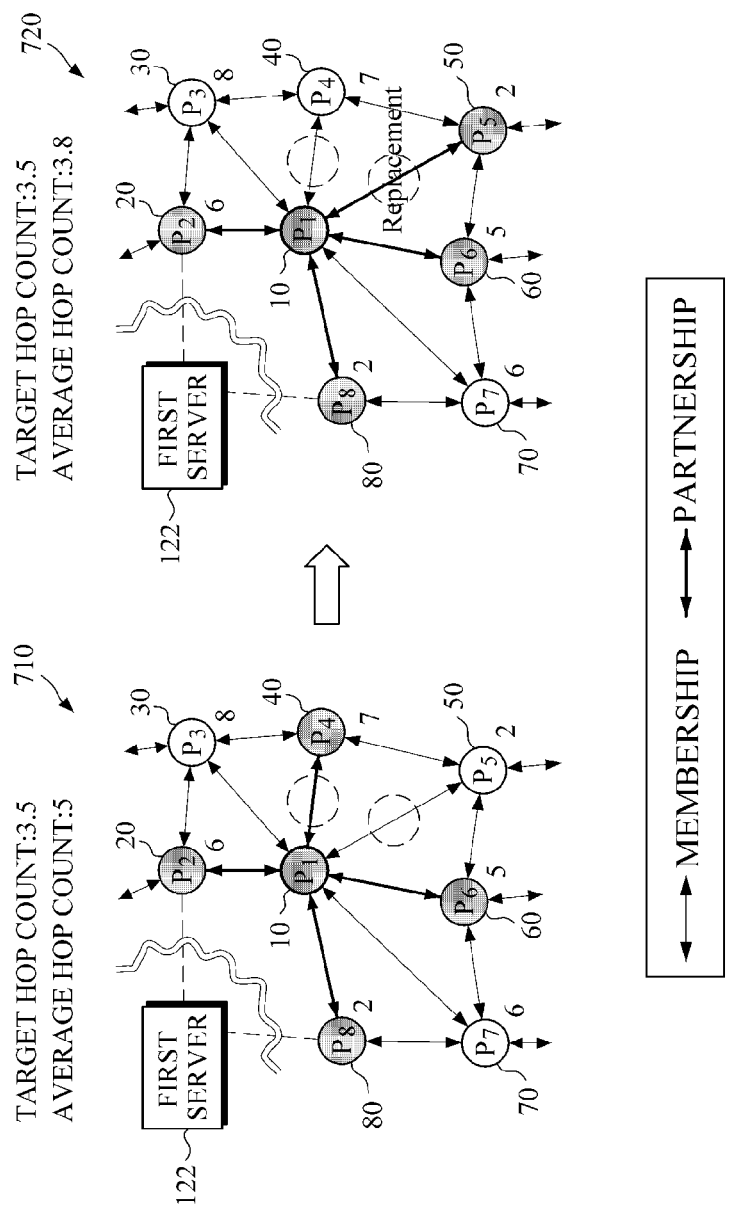
FIG. 7 is a diagram illustrating an example of an operation of rearranging peers through partnership replacement.

FIG. 7 illustrates an example operation of rearranging peers through partnership replacement.

In a network 710 of FIG. 7, a target distance value of peer P1 10 to the first server 122 is 3.5 hops while a current distance of peer P1 10 is 5 hops. Accordingly, peer P1 10 may replace a partnership with a peer closer to a first server 122.

For example, in network 720, peer P1 10 may replace partner peer P4 40 with peer P5 50. Because a distance of peer P4 40 is 7 hops and a distance of peer P5 50 is 2 hops, the average hop count of peer P1 10 becomes 3.8 hops due to the partnership replacement, and peer P1 10 gets closer to the target hop count. Accordingly, partner peers may be selected from among peers in a membership list so that a specific peer gets closer or achieves the target distance value.

For example, the predetermined distance may be determined and changed according to network implementations. If the specific peer does not get closer to the desired target distance value in spite of the partnership replacement, the specific peer may approach the target distance value through membership replacement.

Existing partners may be excluded upon membership replacement. A new membership peer may be more likely to cause a specific peer to approach the target distance value. Accordingly, this process may be iteratively performed so that the specific peer gradually approaches the target distance value.

As explained above, when the difference between the current distance and the target distance of the peer is great, the partnership and/or membership replacement may be performed to achieve the target distance. Even when the difference between the current distance and the target distance of the peer is small, the partnership and/or membership replacement may be performed such that the difference between the current distance and the target distance is equal to or smaller than a predetermined distance. That is, to balance peer movement, peers may move so that the current distance approaches the target distance. Accordingly, peers may get closer to the seed server or farther apart from the seed server.

There are other reasons that may cause the peer to change a partner. For example, when current partners do not have a necessary data segment, the peer may replace one or more of the partners. In this example, partners capable of reducing the difference between the target distance value and the current distance value may be preferentially selected.

An unstructured P2P network with a limited radius and a method of reconfiguring a network according to dynamic scaling will now be described.

As described above, the limited radius of the P2P network leads to a limited move distance of a data segments or a substream that is transferred via peers. If a new peer joins and causes the radius of the P2P network to reach the limited value, a new seed server may be allocated to increase the number of P2P networks. This may cause unbalance between the P2P networks. In order to overcome the unbalance, peer redistribution may be performed to adjust the number of peers between a new P2P network and an old P2P network. This process is referred to as "network split."

Figure 8A:
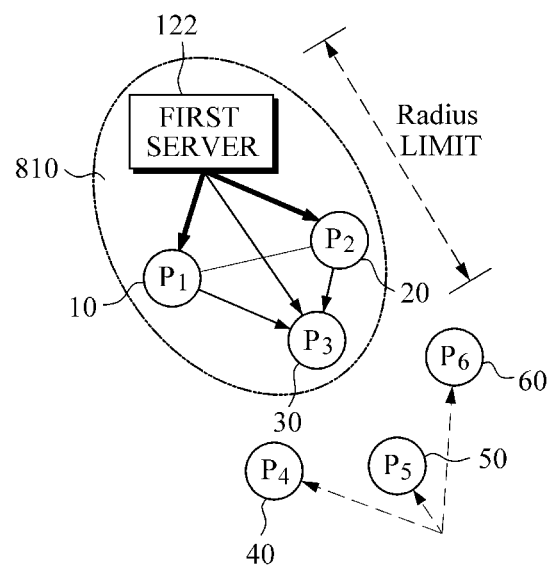
FIGS. 8A through 8C are diagrams illustrating examples of a P2P network split operation.
Figure 8B:
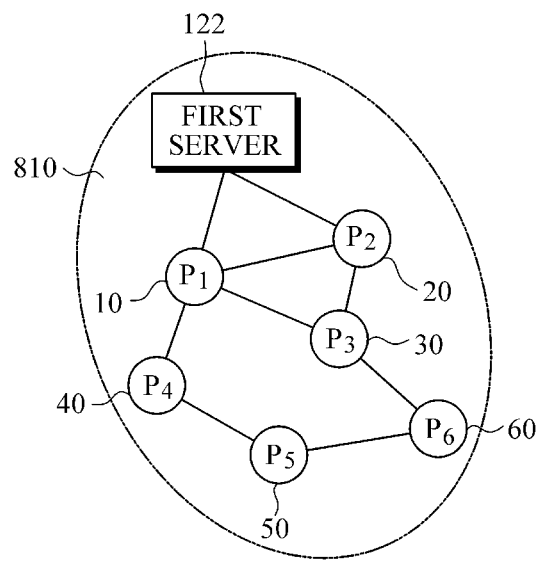
Figure 8C:
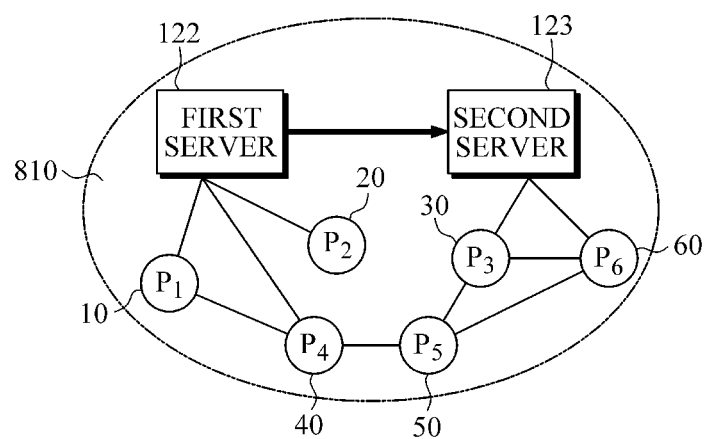

FIGS. 8A through 8C illustrate examples of a P2P network split operation.

P2P network split refers to a process of increasing the number of servers and reconfiguring peers when a radius of a P2P network reaches or exceeds a previously set limit distance. In order to reconfigure the network at a time when the number of the servers is increased, some peers in an old network may be moved to a new network. As shown in FIGS. 8A through 8C a load of seed servers may be balanced and an average distance of the peers in the network may be reduced through the network split.

As shown in FIG. 8A, the limited radius of the P2P network 810 may be 2 hops and peer P4 40, peer P5 50 and peer P6 60 may join the P2P network The P2P network may be configured as shown in FIG. 8B.

As shown in FIG. 8B, one server, for example, the first server 122, provides contents, and an average hop count is 2.1 and a maximum hop count is 4. Accordingly, the max hop count exceeds a limited radius. Accordingly, a P2P network split may be performed as shown in FIG. 8C. As shown in FIG. 8C, a second server 123 is included, and the network split provides a reconfigured P2P network 810 in which an average hop count is 1.3 hops and a maximum hop count is 2 hops. The P2P network may be split according to various schemes.

Figure 9A:
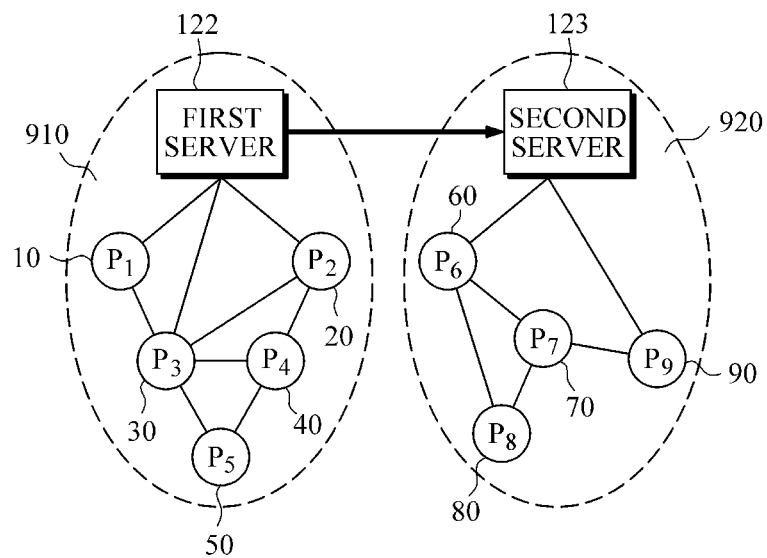
FIGS. 9A through 9C are diagrams illustrating examples of P2P network splits.
Figure 9B:
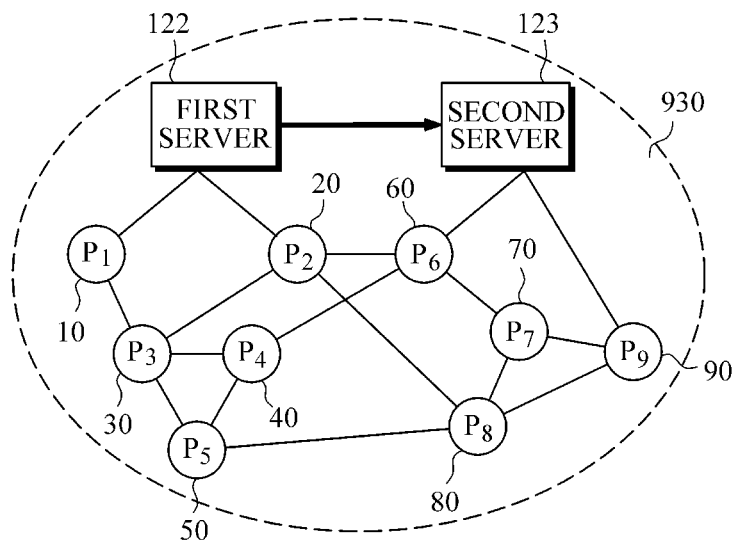
Figure 9C:
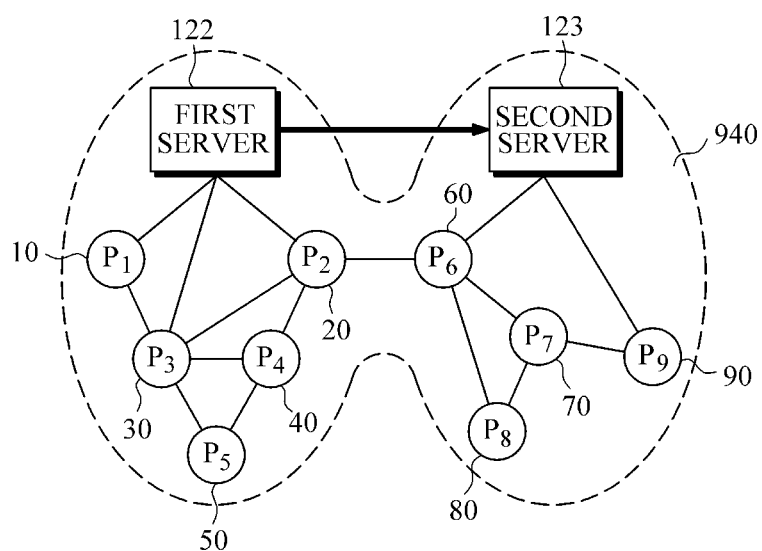

FIGS. 9A through 9C illustrate examples of P2P network splits.

FIG. 9A illustrates a split scheme in which peers in split P2P networks are divided. In a P2P network 910 of FIG. 9A, the peers peer P1 10, peer P2 20, peer P3 30, peer P4 40, and peer P5 50 are connected to a first server 122 and the peers gain membership or partnership with one another. However, the peers 10, 20, 30, 40, and 50 connected to the first server 122 do not gain membership with the peers 60, 70, 80, and 90 connected to a second server 123. Likewise, the peers 60, 70, 80, 90 connected to the second server 123 gain membership or partnership with one another, but not with the peers 10, 20, 30, 40, and 50 connected the first server 122.

This complete split of the P2P network may be implemented by allocating new peers to a new seed server, for example, the second server 123. This scheme has an advantage in that there is no overhead due to the network reconfiguration. However, in this example, the size of the two P2P networks may be unbalanced, causing the seed servers 122 and 123 to be managed inefficiently. In order to prevent the unbalance between the servers, some peers may completely leave the old P2P network and join the new seed server.

In another example of a P2P network split, peers are mixed irrespective of seed servers, as shown in FIGS. 9B and 9C. In this example, at least one peer disconnects from an old seed server and moves to a new network including a new seed server, but membership between peers belonging to the old network and peers belonging to the new network are set according to a previously set ratio.

When mixing is completed as shown in FIG. 9B, membership between the peers belonging to the old network and the peers belonging to the new network may be set according to the same ratio. For example, peer 10 may be a member with each of the two peers connected to the first server 122 and peer 10 may also be a member with each of two peers connected to the second server 123. Accordingly, a peer may be a members with each of the same amount of peers connected to each server in the P2P network.

For example, in a P2P network 930 shown in FIG. 9B, peers 10, 20, 30, 40, and 50 are connected to a first server 122 and peers 60, 70, 80, and 90 are connected to a second server 123. Some of the peers 10, 20, 30, 40, and 50 and some of the peers 60, 70, 80, and 90 may be included in each membership list. Accordingly, peers 10, 20, 30, 40, and 50, which are connected to the first server 122, may form memberships with peers 60, 70, 80, and 90, which are connected to the second server 123.

In another example of a P2P network split, an intermediate process between the complete split and the complete mixing, as shown in FIG. 9C may be performed. In this example, membership is gained between all peers in both networks, as in complete mixing. However, the membership between peers belonging to an old network and peers belonging to a new network are gained in a different ratio rather than the same ratio. That is, a connection inside each P2P network is further strengthened and a connection between the P2P networks is relatively weak. This ratio is determined by a server upon network split and explicitly informed to peers to be moved.

For example, in a P2P network 940 shown in FIG. 9C, peers 10, 20, 30, 40, and 50 are connected to a first server 122, and peers 60, 70, 80, and 90 connected to a second server 123. The list of peers 10, 20, 30, 40, and 50 and the list of peers 60, 70, 80, and 90 connected to a second server 123 may be included in a 3:1 ratio in each membership list. Likewise, the list of the peers 60, 70, 80, 90 and the list of the peers 10, 20, 30, 40, and 50 connected to the first server 122 may be included in a 3:1 ratio in each membership list.

For example, a peer may form memberships with three peers connected to the first server (e.g., first server 122), and only form a membership with one peer connected to the second server (e.g., second server 123). For example, peer 20 may form memberships with peers 30, 40, and 50, and form a membership with peer 60.

Accordingly, when one seed server, for example, the first server 122, must suddenly unexpectedly stop service, the reconfiguration process using the method shown in FIG. 9B or 9C allows the service to be maintained and data availability upheld because the peers 10, 20, 30, 40 and 50 have gained the membership with at least one or more of peers 60, 70, 80, 90 connected to the second server 123.

Figure 10B:
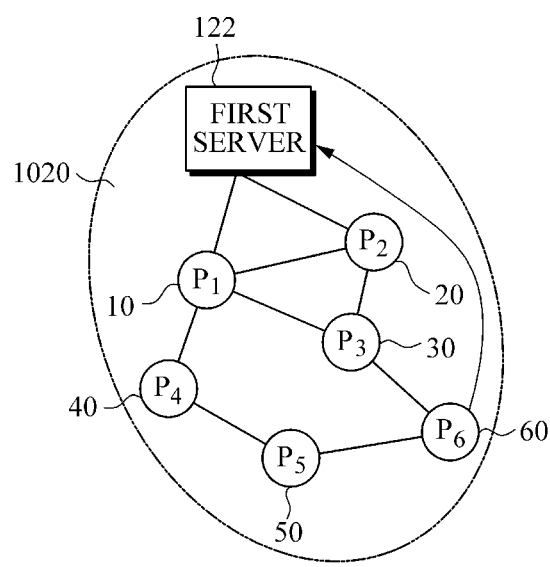
Figure 11A:
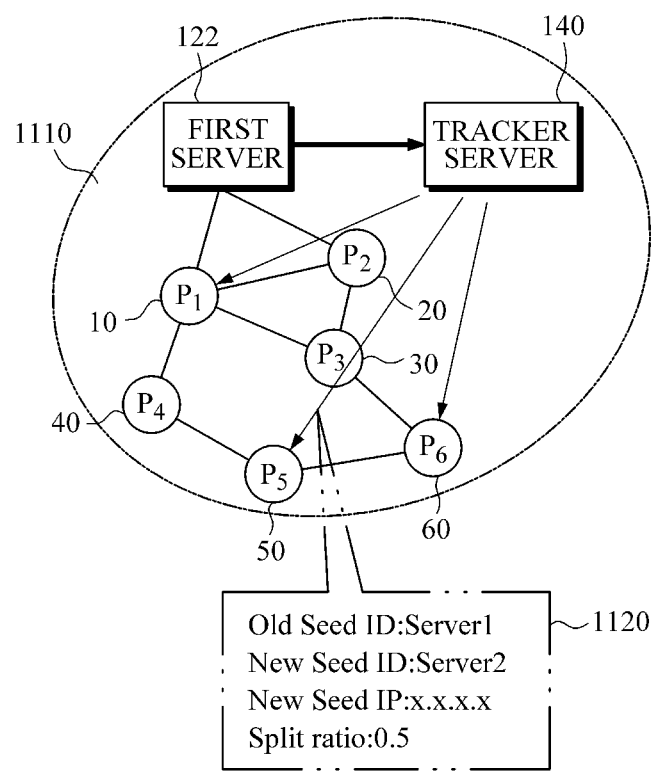
FIG. 11A is a diagram illustrating an example of an operation of delivering a split notification message in a tracker-based P2P network.
Figure 11B:
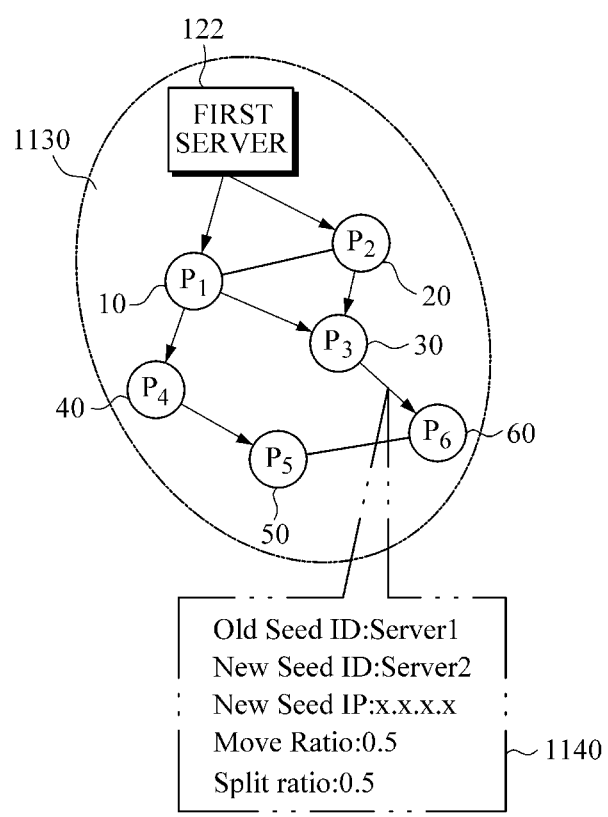
FIG. 11B is a diagram illustrating an example of an operation of delivering a split notification message in a gossip-based P2P network.

Hereinafter, the P2P network split process is described with reference to FIGS. 10A and 10B illustrating delivery of a peer report message and FIGS. 11A and 11B illustrating delivery of a split notification message.

FIGS. 10A through 10C illustrate examples of delivery of a peer report message.

In the examples shown in FIGS. 10A and 10B, the radiuses of P2P networks 1010 and 1020 are exceeded. In this example, some peers may see that their distance values exceeds a limited radius. A new peer may see that the radius is exceeded when joining the network. Existing peers can see that the target distance value or the current distance value is greater than the limited radius while replacing the membership and the partnership.

As shown in FIG. 10A, in a P2P network 1010 including a tracker server 140, the tracker server 140 may periodically collect peer report messages from peers 10, 20, 30, 40 50, and 60 for peer leveling. Because the tracker server 140 may distinctly see the network radius by collecting the peer report messages, the tracker server 140 may see that the network departs from the radius limit.

Meanwhile, in a network 1020 that does not include a tracker server 140 as shown in FIG. 10B, some peers 10, 20, 30, 40, 50, and 60, for example, peer P6 60, may infer that they exceed the radius limit when inferring a target distance value. Accordingly, when peer P6 60 recognizes that its own distance value deviates from the limited radius, peer P6 60 may immediately report this. Alternatively, when peer P6 60 recognizes that its own distance value exceeds the limited radius, peer P6 60 may send a peer report message to the first server 122 after a predetermined amount of time lapses.

For example, peer P6 60 may replace an existing membership with a peer closer to the first server 122 to reduce the distance from the first server 122. Through the membership replacement, peer P6 60 may decrease the distance from the first server 122 within a previously set limit radius of the P2P network. When the current distance value remains greater than the target distance value or the limited radius in spite of additional collection of the distance information, peer P6 60 may report this to the first server 122 through the peer report message.

FIG. 10C illustrates an example of a peer report message 1030 that is collected by the tracker server 140 in FIG. 10A or sent to the first server 122 in FIG. 10B. As shown in FIG. 10C, the peer report message may include, for example, a seed ID, a peer IP address, a distance type (Dist type), a distance value type (Dist value type), a distance value (Dist value), and a capacity of an uplink channel (Up capacity).

When the tracker server 140 determines that the network radius has been exceeded as a result of collecting the peer report message, the network split may be performed. If the tracker server 140 is not present, a seed server such as the first server 122, may initiate the network split. In order to split the network, the number of seed servers is first increased, and the split notification message is sent to members of the P2P network belonging to an old seed server.

For example, when a network split is a complete split shown in FIG. 9A and there is no explicit reconfiguration, split notification messages may not be used. When the split form is a complete split form but network reconfiguration is performed to balance between the P2P networks, or in the case of mixing split form as shown in FIGS. 9B and 9C, split notification messages may be used.

FIG. 11A illustrates an example of an operation of delivering a split notification message in a tracker-based P2P network.

In a tracker-based P2P network 1110 as shown in FIG. 11A, a seed server sends a split notification message to some peers selected by a tracker server 140. The number of peers to which the split notification message is sent to may depend on a limit radius of a new P2P network. For example, if the radius limit of the new P2P network is the same as that of an old P2P network, the tracker server 140 may send the split notification message to half of peers that have joined the old P2P network.

As shown in FIG. 11A, in the tracker-based P2P network 1110, the tracker server 140 may send the split notification message 1120 to peer P1 10, peer P5 50, and peer P6 60. Upon receipt of the tracker-based split notification message 1120, the peers 10, 50 and 60 join the new seed server based on information included in the split notification message 1120.

The peers 10, 50 and 60 may move to a new network and gain membership, and a membership forming ratio (Split Ratio) of peers belonging to both of the networks may depend on a network split form. The peers are informed of the ratio through the split notification message 1120. For example, the split ratio may be 1 in the complete split form and the split ratio may be 0.5 in the complete mixing form. In a loose split form, the split ratio may range from 0 to 1, excluding 0.5.

The split notification message 1120 may include, for example, an ID of an old seed server (Old Seed ID), an ID of a new seed server (New Seed ID), an IP address of the new seed server (New Seed IP), and a split ratio.

FIG. 11B illustrates an example of an operation of delivering a split notification message in a gossip-based P2P network. As shown in FIG. 11B, in the gossip protocol-based P2P network 1130, the split notification message is flooded using gossip protocol. A gossip protocol-based split notification message 1140 may further include a move ratio, unlike the tracker-based split notification message. The move ratio may include information indicating how many peers are moving to a new seed server. For example, the move ratio may be set to 0.5. The move ratio of 0.5 means that 50% of peers receiving the message are moved.

In a gossip protocol-based P2P network, some nodes receiving the split notification message 1140 perform a process of joining a new seed server according to the move ratio included in the split notification message 1140. Movement to the new seed server may be determined by each peer target distance and a current distance information. In general, peers having a current distance greater than the target distance will attempt to move to the new seed server.

Heretofore, a scheme for reducing delay time of a streaming service by increasing the P2P network number through the P2P network split process has been described. A scheme of efficiently using resources by decreasing the P2P network number is described with reference to FIG. 12.

When peers leave the network during the streaming service, the service may be provided to a minimum number of peers set in advance or less in each seed server. Thus, when the radius of the P2P network is equal to or smaller than a predetermined value, one server may be inactivated and the peers connected to the inactivated server may join a P2P network including other seed servers. This process is referred to as a "network merge."

Figure 12:
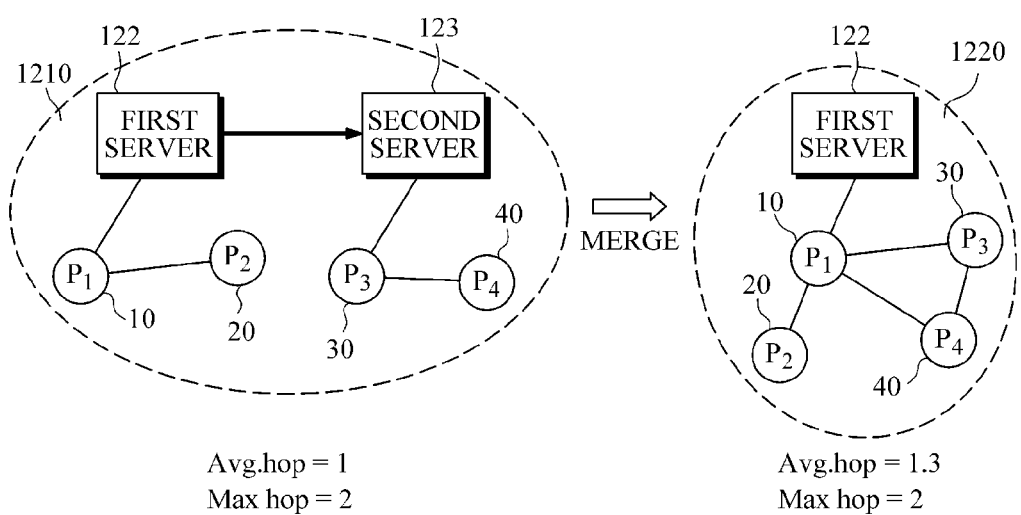
FIG. 12 is a diagram illustrating an example of a merge operation in a P2P network.

FIG. 12 illustrates an example of a merge operation in a P2P network.

It is desirable to reduce server management cost within a range in which a delay time is reduced. Efficient management of servers may be performed by integrating a network including such that less seed servers are used. For example, if there are two or more P2P networks of which the limit radius has not been exceeded, a P2P network system may perform a merge operation to decrease the number of servers and integrate and reconfigure the network.

As shown in FIG. 12, a P2P network 1210 is reconfigured into a P2P network 1220 through P2P network merge. In this example, a limit distance may be 2 hops. After the merge, an average distance of peers 10, 20, 30, and 40 may increase from 1 to 1.3, while the number of servers can be decreased from 2 to 1, with a second server 123 excluded from the P2P network 1210, without exceeding the limit distance. Accordingly, after the merge the current distance may remain within the target distance of 2 hops.

A merge point in time may be determined using several methods.

For example, in a tracker-based P2P network, the tracker server 140 manages the number of peers in the P2P network as described with reference to FIG. 10A. Accordingly, the merge may be determined when the number of the peers is equal to or smaller than a threshold.

When the tracker server 140 does not exist, peers themselves may estimate that the network radius is smaller than a threshold, as described with reference to FIG. 10B. As in the split, if it is determined based on the result of iteratively performing estimation that the network radius is smaller than a threshold, a peer report message may be sent to the seed server. The seed server may determine a point in time for the network merge. The seed server may receive peer report messages from peers indicating the peer has a distance from the seed server that is smaller than a set minimum distance. When the number of peer report messages received seed server is equal to or greater than a predetermined number, the seed server may determine to perform a network merge.

Figure 13A:
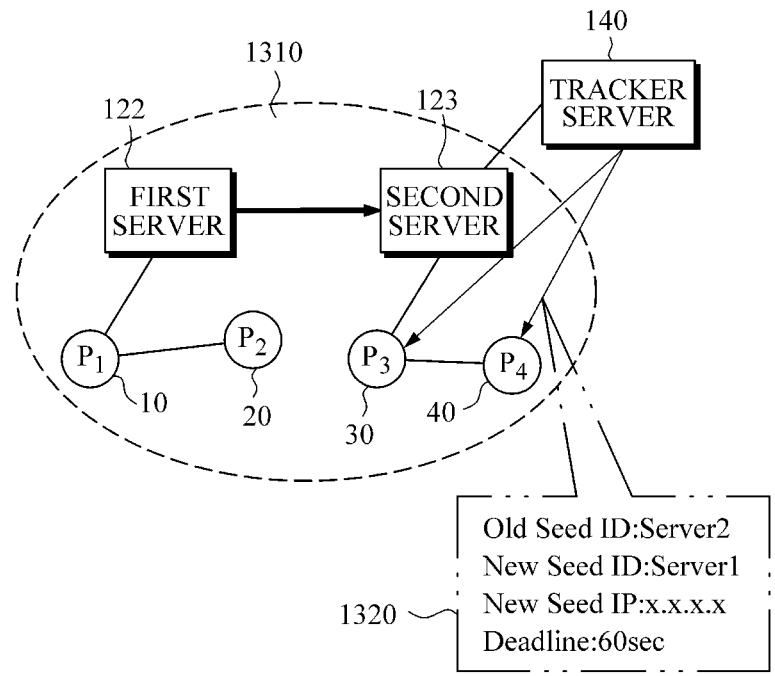
FIGS. 13A and 13B are diagrams illustrating an operation of delivering a merge notification message.
Figure 13B:
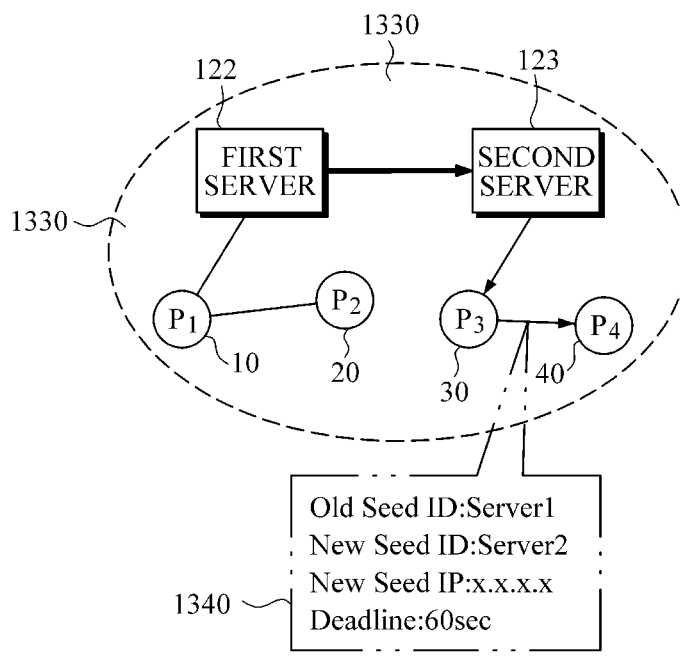

FIGS. 13A and 13B illustrate examples of an operation of delivering a merge notification message.

As shown in FIG. 13A, in a tracker-based P2P network 1310, a seed server sends a merge notification message 1320 to the peers registered in a tracker server 140. The merge notification message 1320 may include, for example, an ID of an old seed server (Old Seed ID), an ID of a new seed server (New Seed ID), an IP address of the new seed server (New Seed IP), and a deadline.

As shown in FIG. 13B, in a gossip protocol-based P2P network 1330, a first server 122 and a second server 123 deliver a merge notification message 1340 to deputy peers, for example, peer P1 10 and peer P2 20, using gossip protocol, respectively. The merge notification message 1340 may be flooded from peer P1 10 and peer P2 20 to other peers 30 and 40, respectively. In the example of the gossip protocol-based P2P network, the merge notification message 1340 may be the same as the merge notification message 1320 in the tracker-based P2P network. Peers to be moved may receive the merge notification messages 1320 and 1340, join the new seed server to gain membership, and completely leave the old network.

The merge methods may differ according to various split structures shown in FIGS. 9A through 9C. As described above with reference to FIG. 9A, in the complete split structure, peers to be moved join the new seed server to gain membership, and completely leave the old P2P network.

As described above with reference to FIGS. 9B and 9C, in the example of the complete mixing or the loose mixing, a part of the membership with the peers belonging to the old network is discarded, and existing membership with the peers belonging to the new network is maintained unchanged. In addition, new membership with the peers belonging to the new network is formed.

As described above, some existing P2P messages may be changed and new messages may be added so that the P2P network management method may be performed. Information that is added to an existing message to be changed and a format of a newly added message will now be described.

FIGS. 14A through 14C illustrate examples of information included in a join response message.

As described above, a join process is the same as that in the old P2P network and content of the join request message is also the same as that in the old P2P network.

The join response message may include, for example, an ID of a seed server (Seed ID), an IP address of the seed server (Seed IP), a type of a distance value (e.g., a hop count or a delay time; Distance type), a limit value of the distance value (e.g., a radius value; Radius limit value), in addition to information normally included in a network message, such as message identification information, message length information, and CRC information, as shown in FIG. 14A.

The ID of the seed server (Seed ID) is an identifier of a seed server from which a peer calculates a distance. The IP address of the seed server (Seed IP) is information used when a peer requests the seed server provide an emergent data segment. The distance value type (Distance Type) is information on a unit used to measure the distance from the seed server. The distance limit value or radius value (Radius limit value) is set in the server in order to guarantee a maximum amount of delay.

FIG. 14B illustrates an example of a join response message represented by a bencoding code scheme, and FIG. 14C illustrates an example of a join response message represented by an XML code scheme. Although the join response message is represented here by the bencoding code scheme and the XML code scheme, it should be understood that the join response message may be represented in a variety of coding schemes.

FIGS. 15A through 15C illustrate examples of information included in a membership message.

Examples of the membership message include a membership request message and a corresponding membership response message. In a tracker-based P2P network, the membership request message may be sent from a tracker server to peers in a peer list. In a gossip-based P2P network, the membership request message may be flooded to adjacent nodes using a gossip protocol.

In addition to existing information, network information may be added to the membership request message and the membership response message, as shown in FIG. 15A. For example, an ID of the seed server (Seed ID), an IP address of a peer (Peer IP), current distance information, target distance information, a capacity of an uplink channel of the peer (Uplink capacity), and prediction information for an overall network may be added.

The current distance information may include, for example, a current distance value (e.g., a hop count or a delay time; Distance Type), a current distance value representation scheme (e.g., All, Min, Max, and Avg; Distance value Type), and a current peer distance value (Distance value).

The target distance information may include, for example, a target distance type (Target distance type), a target distance representation scheme (Target distance value type), and a target distance value (Target distance value).

The ID of the seed server (Seed ID) refers to an identifier of a seed server peer from which a peer calculates a distance. The IP address of a peer (Peer IP) is used as an identifier of the peer.

The type of the current distance value (e.g., a hop count or a delay time; Distance Type) indicates a unit used to measure a current distance of the peer, the current distance value representation scheme (e.g., All, Min, Max, and Avg; Distance value Type) indicates a scheme by which the current peer distance is measured, and the current distance value of the peer (Distance value) indicates a current peer distance value according to the current distance value representation scheme.

The target distance type (Target distance type) indicates a unit used to measure a target distance, a target distance representation scheme (Target distance value type) indicates a unit used to measure the target distance, and a target distance value (Target distance value) indicates a target distance value according to the target distance representation scheme.

The membership protocol may be used when peers send and receive network prediction information to and from each other. Accordingly, prediction information of the overall network may include the total number of peers (Est. Num of Peer) and a total average capacity of the uplink channel (Est. Avg. Up capacity).

FIG. 15B illustrates an example of a membership request message represented by a bencoding scheme, and FIG. 15C illustrates an example of a membership request message represented by an XML scheme. Although the membership request message is represented here by the bencoding scheme and the XML scheme, it should be understood that the membership request message may be represented by various other coding schemes.

FIGS. 16A through 16C illustrate examples of information included in a peer report message.

As shown in FIG. 16A, a peer report message may include, for example, an ID of a seed server (Seed ID), an IP address of a peer (Peer IP), current distance information of the peer, and a capacity of an uplink channel of the peer (Uplink capacity). The current distance information of the peer may include, for example, a type of distance value (Distance Type), a distance value representation scheme (Distance value type), and a distance value (Distance Value).

The ID of the seed server (Seed ID) refers to an identifier of a seed server from which a peer calculates a distance. The IP address of the peer (Peer IP) is used as an identifier of the peer. The type of the distance value (Distance Type) is information on a unit used to measure the distance. The distance value representation scheme (Distance value type) is a method of calculating and representing the measured distance value. The capacity of the uplink channel of the peer (Uplink capacity) indicates an available capacity of an uplink channel of a current peer.

FIG. 16B illustrates an example of a peer report message represented by a bencoding scheme, and FIG. 16C illustrates an example of a peer report message represented by an XML scheme. Although the peer report message is represented here by the bencoding scheme and the XML scheme, it should be understood that the peer report message may be represented by various other coding schemes.

FIGS. 17A through 17C illustrate examples of information included in a summary report message.

For example, a summary report message may include summary information of an overall network, a percentile rank of a specific peer, and a target distance value of the specific peer. The summary information of an overall network may be information on, for example, a total peer number (Num of Peers) and an average capacity of an uplink channel of peers (Avg. Up Capacity). The percentile rank of a specific peer is ranking information for a peer receiving a summary report based on the capacity of the uplink channel. The target distance value of the specific peer (Distance value) may be provided together with a type of the distance value (Distance type) and a distance value representation scheme (Distance value type).

FIG. 17B illustrates an example of a summary report message represented by a bencoding scheme, and FIG. 17C illustrates an example of a summary report message represented by an XML scheme. Although the summary report message is represented here by the bencoding scheme and the XML scheme, it should be understood that the summary report message may be represented by various other coding schemes.

FIGS. 18A through 18F illustrate examples of information included in a split notification message.

As described above, the split notification message may differ between a tracker-based P2P network and a gossip protocol-based P2P network.

As shown in FIG. 18A, in a tracker-based P2P network, the split notification message may include, for example, an ID of an old seed server (Old Seed ID), an ID of a new seed server (New Seed ID), an IP address of the new seed server (New Seed IP), and a ratio of membership peers between an old network and a new network (Split Ratio).

The ID of the old seed server (Old Seed ID) is an identifier of a seed server to which a peer currently belongs. The ID of the new seed server (New Seed ID) is an identifier of a seed server to which a peer must move to. The IP address information of the new seed server (New Seed IP) is used when peers to be moved make a join request or a request for emergent data. The ratio of membership peers between an old network and a new network (Split Ratio) is a value determining a split form. Depending on this value, a ratio in which membership peers are selected in the old network and the new network is determined.

FIG. 18B illustrates an example of a split notification message that is represented by a bencoding scheme in a tracker-based P2P network, and FIG. 18C illustrates an example of a split notification message represented by an XML scheme in a tracker-based P2P network. Although the split notification message is represented here by the bencoding scheme and the XML scheme, it should be understood that the split notification message may be represented by various other coding schemes.

In a gossip protocol-based P2P network, the split notification message may include, for example, an ID of an old seed server (Old Seed ID), an ID of a new seed server (New Seed ID), an IP address of the new seed server (New Seed IP), a ratio of peers to be moved (Move Ratio), and a ratio of membership peers between an old network and a new network (Split Ratio), as shown in FIG. 18D. Unlike the tracker-based split notification message, the gossip protocol-based split notification message may additionally include a ratio of peers to be moved (Move Ratio) that refers to a value indicating a ratio of peers to be moved among peers receiving the split notification message in the gossip protocol-based P2P network, as described above.

FIG. 18E illustrates an example of a split notification message represented by a bencoding scheme in a gossip protocol-based P2P network, and FIG. 18F illustrates an example of a split notification message represented by an XML scheme in a gossip protocol-based P2P network.

FIGS. 19A through 19C illustrate examples of information included in a merge notification message.

As shown in FIG. 19A, a merge notification message may include, for example, an ID of an old seed server (Old Seed ID), an ID of a new seed server (New Seed ID), an IP address of the new seed server (New Seed IP), and a deadline.

The ID of the old seed server (Old Seed ID) is an identifier of a seed server to which a peer currently belongs. The ID of the new seed server (New Seed ID) is information on a seed server to which the peer must move. The IP address of the new seed server (New Seed IP) is used when peers to be moved make a join request or a request for emergent data. The deadline is a time by which the merge process must be terminated. After the deadline, normal operation of a previous server may not be guaranteed.

FIG. 19B illustrates an example of a split notification message represented by a bencoding scheme in a gossip protocol-based P2P network, and FIG. 19C illustrates an example of a split notification message represented by an XML scheme in a gossip protocol-based P2P network. Although the split notification message is represented here by the bencoding scheme and the XML scheme, it should be understood that the split notification message may be represented by various other coding schemes.

Figure 20:
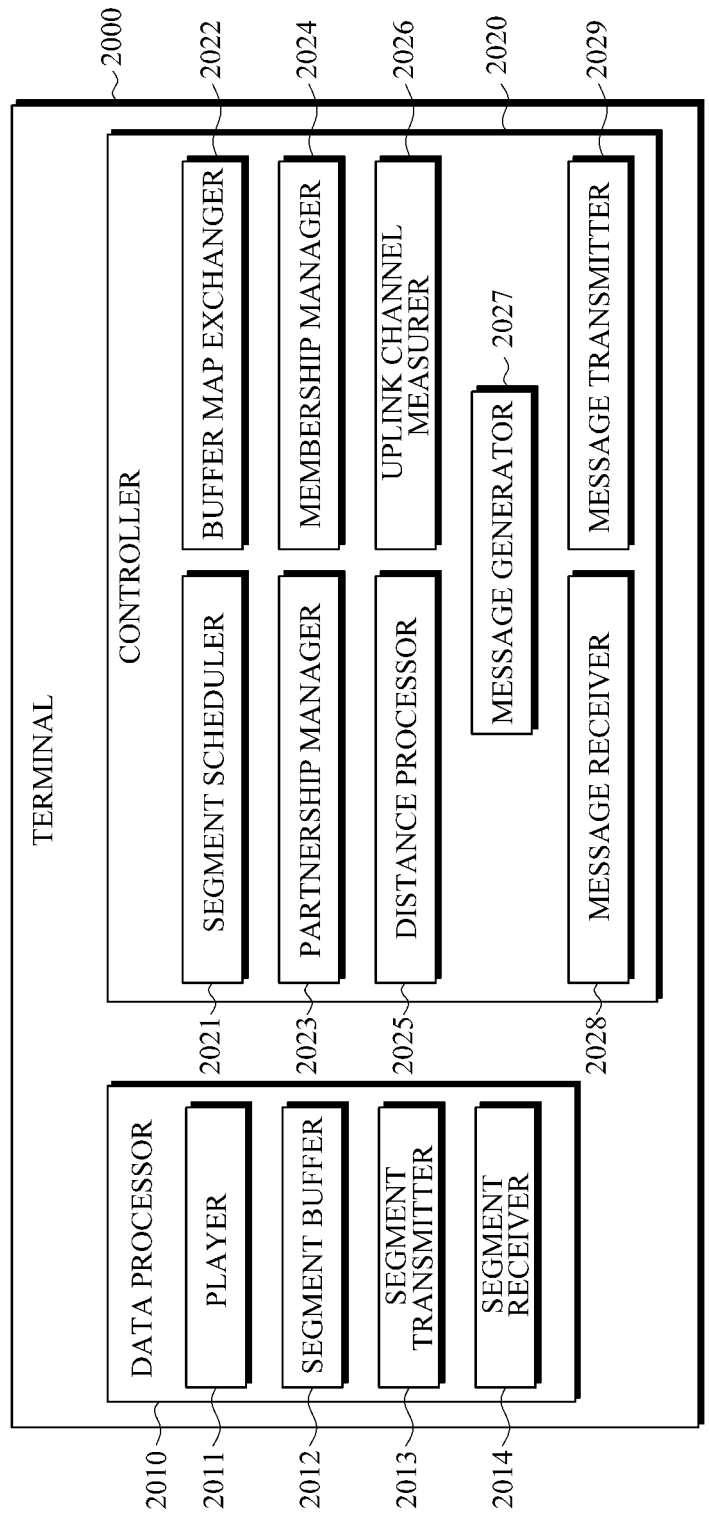
FIG. 20 is a diagram illustrating an example of a terminal that joins a P2P network system and receives a streaming service.

FIG. 20 illustrates an example of a terminal that joins a P2P network system and receives a streaming service.

A terminal 2000 in this example is a peer device and includes a data processor 2010 and a controller 2020. The data processor 2010 performs an operation related to a data of streaming content and includes a player 2011, a segment buffer 2012, a segment transmitter 2013, and a segment receiver 2014.

The player 2011 plays received data segments and provides the data segments to a user. The segment buffer 2012 stores the data segments from the player 2011. The segment transmitter 2013 transmits the data segments in response to a request from other peers, and the segment receiver 2014 receives data segments from other peers or seed servers.

The controller 2020 includes a segment scheduler 2021, a buffer map exchanger 2022, a partnership manager 2023, a membership manager 2024, a distance processor 2025, an uplink channel measurer 2026, a message generator 2027, a message receiver 2028, and a message transmitter 2029.

The segment scheduler 2021 may schedule the data segments by referring to a buffer map, and control the message generator 2027 to generate a message requesting other peers or seed servers to provide data segments. For example, if the terminal does not have segments of data that are to be played, the terminal may request the other peers for seed servers for the data segments to be played. The buffer map exchanger 2022 may exchange the buffer map with the seed server or the other peers so that the segment scheduler 2021 may determine a peer having a desired data segment.

The partnership manager 2023 gains and changes partnership with other peers. The membership manager 2024 manages a peer list and periodically updates the peer list. The membership manager 2024 may periodically update the peer list, for example, through a gossip protocol or through a tracker-based protocol from the tracker server.

The distance processor 2025 performs an operation to determine the distance of the terminal 2000 from the seed server. The distance processor 2025 measures a current distance from the seed server. The distance processor 2025 may calculate the current distance by adding a distance between the terminal and a partner to a distance value of the partner. For example, when the type of the distance value is a hop count, a hop count of a peer may be determined by adding 1 to a hop count of adjacent peers. If the type of the distance value is a delay time, the distance processor 2025 may calculate a delay time of a specific peer by adding the measured delay time from adjacent peers to the terminal, to a delay time of the adjacent peers.

When the P2P network is managed according to gossip-based protocol, the distance processor 2025 may infer a target distance of the terminal 2000 using information included in the membership response message that the terminal 2000 has received from other peers or terminals. The inferred target distance may be included in the membership request message and may be transmitted to other peers.

When the current distance of the peer from the seed server is different from the target distance, the distance processor 2025 controls the partnership manager 2023 to perform partnership replacement in order to maintain an optimal partnership and to achieve the target distance. When the current distance is farther than the target distance from the seed server, the partnership manager 2023 may replace a partnership of a peer with at least one peer closer to the seed server. On the other hand, when the current distance is closer than the target distance to the seed server, the partnership manager 2023 may replace the partnership of a peer with at least one peer farther from the seed server.

When the current distance does not reach the target distance in spite of the partnership replacement, the distance processor 2025 may request the membership manager 2024 to perform membership replacement. Upon receipt of a membership replacement request from the distance processor 2025, the membership manager 2024 may perform membership replacement to replace at least one peer with a peer that is closer to or farther from the seed server such that the current distance approaches the target distance by a predetermined amount.

The uplink channel measurer 2026 measures and monitors the capacity of the uplink channel currently available in a P2P network for a streaming service.

The message generator 2027 generates various messages used in the P2P network. The message receiver 2028 receives and processes network management messages from the other peers. The tracker server or the seed server, and the message transmitter 2029, transmit the messages from the message generator 2027 to the other peers and the tracker server or the seed server.

When a peer desires to join the P2P network, the message transmitter 2029 sends the join request message from the message generator 2027 to the seed server. The message receiver 2028 receives a join response message form the seed server. The message receiver 2028 acquires information on a previously set limit distance of the P2P network from the join response message and delivers the information to the distance processor 2025. When the distance from the peer to the seed server exceeds a previously set limit distance, the distance processor 2025 may control the membership manager 2024 to replace at least one membership server with at least one peer that is closer to the seed server in order to reduce the distance from the seed server.

The message generator 2027 generates a peer report message including the current distance information and the capacity of the uplink channel as described above, and the message transmitter 2029 may deliver the peer report message to the seed server or the tracker server, according to the network management protocol. The message transmitter 2029 may transmit the peer report message to the seed server or the tracker server periodically, or the message transmitter 2029 may transmit the peer report message when it is determined that the terminal 2000 is at a location that exceeds a previously set limit distance.

When the message generator 2027 generates a membership request message, the message transmitter 2029 may transmit the generated membership request message to another peer. The message receiver 2028 may receive a membership response message from another peer and process the membership response message.

The message receiver 2028 receives a summary report message as a network management message including summary information of the network, from the tracker server, and processes the summary report message. Accordingly, the distance processor 2025 may acquire target distance information included in the summary report message.

The message receiver 2028 receives a split notification message as a network management message from the seed server or the tracker server, according to the network management protocol. The message receiver may process the split notification message. The split notification message information may be delivered to the partnership manager 2023 and the membership manager 2024. Under control of the partnership manager 2023 and the membership manager 2024, the terminal 2000 may disconnect from an old seed server and move to the network including the new seed server.

When the split notification message is received through the gossip protocol, the partnership manager 2023 and the membership manager 2024 may determine whether to move to the network including the new seed server based on the current distance information.

Also, the message receiver 2028 may receive a merge notification message as a network management message from the seed server or the tracker server, according to the network management protocol. The message receiver 2028 may process the merge notification message. Upon receipt of the merge notification message, the message receiver 2028 delivers the merge notification message information to the partnership manager 2023 and the membership manager 2024, such that the terminal 2000 moves to the network including the new seed server.

Figure 21:
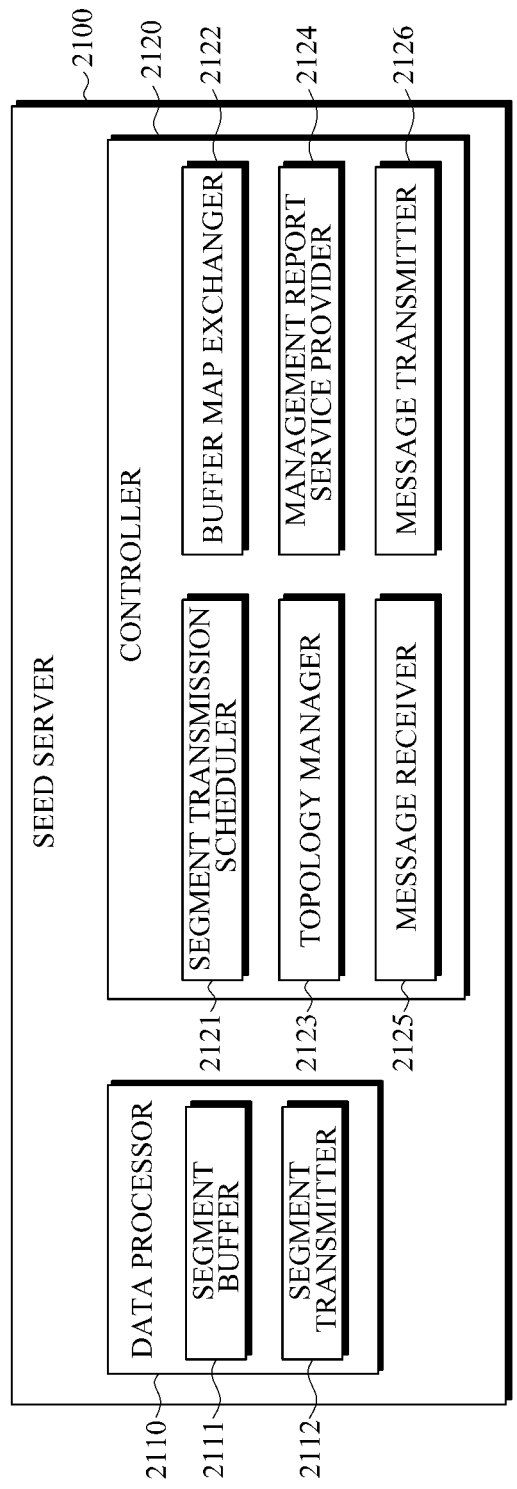
FIG. 21 is a diagram illustrating an example of a seed server providing a streaming service to a terminal in a P2P network system.

FIG. 21 illustrates an example of a seed server providing a streaming service to a terminal in a P2P network system.

Referring to FIG. 21, seed server 2100 includes a data processor 2110 and a controller 2120.

The data processor 2110 provides content data to at least one peer or terminal that has joined a P2P network. The data processor 2110 includes a segment buffer 2111 and a segment transmitter 2112. The segment buffer 2111 temporarily stores data segments to be transmitted. The segment transmitter 212 may transmit the data segment to peers directly connected to the seed server 2100 and may transmit the data segment to other peers in response to a request from the other peers.

The controller 2120 includes a segment transmission scheduler 2121, a buffer map exchanger 2122, a topology manager 2123, a management report service provider 2124, a message receiver 2125, and a message transmitter 2126.

The segment transmission scheduler 2121 schedules data segment transmission to the peer by referring to the buffer map.

The buffer map exchanger 2122 may provide the buffer map to the peers and recognize data that is needed by the peers based on the buffer maps received from the peers.

When there is no tracker server in the P2P network, the topology manager 2123 may collect information included in the peer report message that the message receiver 2125 has received from peers. Accordingly, the topology manager 2123 may monitor the network and generate a network management message based on information included in the collected peer report message.

The message receiver 2125 receives the various messages from the network and processes the messages. In response to the message receiver 2125 receiving, from the peer, a join request message requesting to join the P2P network, the topology manager 2123 generates a join response message in response to the received join request message. The join response message includes a previously set limit distance of the network. The message transmitter 2126 transmits the generated join response message to the peer.

The topology manager 2123 may determine a network split to include a new seed server in the P2P network. In addition, the topology manager 2123 may cause a new peer to join the new seed server or some existing peers to join the network including the new seed server. The network split may be determined when an accumulated number of received peer report messages indicating a peer's distance from the seed server exceeds the previously set limit distance, is equal to or greater than a predetermined number.

When the P2P network is managed according to the gossip-based protocol and the topology manager 2123 determines P2P a network split, the topology manager 2123 generates a split notification message as a network management message. The message transmitter 2126 may flood the generated split notification message to the peers according to the gossip protocol.

The topology manager 2123 may determine network merge to remove at least one seed server from the P2P network and to cause all peers that have joined the P2P network including the removed seed server to join one or more other existing seed servers of the P2P network. The network merge may be determined when an accumulated number of received peer report messages indicating a peer's distance from the seed server is less than the previously set minimum distance, is equal to or greater than a predetermined number.

When the P2P network is managed according to the gossip-based protocol and the topology manager 2123 determines P2P a network merge, the topology manager 2123 generates a merge notification message as a network management message. The message transmitter 2126 may flood the generated merge notification message to peers according to the gossip protocol.

The management report service provider 2124 may request a server that is capable of including or excluding a seed server, for example, a load balance server (not shown) to perform the network split or merge. When the seed server 2000 serves as the load balance server, the management report service provider 2124 may not be included. The management report service provider 2124 may also request the load balance server to perform the network split or merge even if the traffic load is excessively heavy or light.

Figure 22:
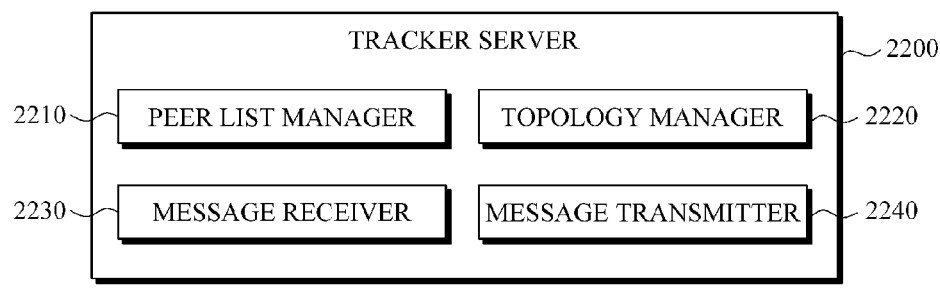
FIG. 22 is a diagram illustrating an example of a tracker server that is used when a P2P network is managed by tracker-based protocol.

FIG. 22 illustrates an example of a tracker server that is used when a P2P network is managed by tracker-based protocol.

A tracker server 2200 includes a peer list manager 2210, a topology manager 2220, a message receiver 2230, and a message transmitter 2240.

The peer list manager 2210 manages a peer list and participates in peer membership. The message receiver 2230 receives a peer report message that may include current distance information and capacity information of the uplink channel from at least one peer included in the peer list. The message receiver 2230 delivers the peer report message to the topology manager 2220.

The topology manager 2220 collects the delivered peer report message, and generates a network management message for managing the P2P network, based on the current distance information of at least one peer and the capacity information of the uplink channel. The message transmitter 2240 transmits the generated network management message to peers included in the peer list.

The topology manager 2220 collects the current distance of peers and the capacity information of the uplink channel included in the peer report message, and measures a target distance of each peer and state information of the overall network. The topology manager 2220 may generate a summary report message as a network management message. The topology manager 2220 may include the measured information, and the message transmitter 2240 may deliver the generated summary message to each peer.

If the topology manager 2220 determines a P2P network split by referring to the peer report message information, the topology manager 2220 may generate a split notification message as a network management message. The message transmitter 2240 delivers the split notification message to the peers that are to be disconnected from an old network and that are to be moved to a new network.

When the topology manager 2220 determines a P2P network merge by referring to the peer report message information, the topology manager 2220 may generate a merge notification message as a network management message. The topology manager 2220 may determine a network merge by recognizing that the number of managed peers is equal to or smaller than a previously set threshold. The message transmitter 2240 transfers the merge notification message to all peers to be disconnected from the old network and to be moved to the new network.

Accordingly, in the P2P network system that provides a streaming service, a maximum delay time and an average delay time may be reduced. Also, the P2P network system may be managed such that the maximum delay time and the average delay time may be reduced using the smallest number of seed servers necessary.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal, comprising:
    a distance processor configured to measure a distance to a seed server that provides contents to the terminal via a network;
    a message generator configured to generate a network join request message and a peer report message, the peer report message comprising information on the distance to the seed server;
    a message transmitter configured to:
        transmit the join request message to the seed server; and
        transmit the peer report message to the seed server or a tracker server; and
    a message receiver configured to:
        receive, from the seed server, a join response message comprising previously set limit distance information for the network; and
        process the join response message, wherein:
    the message generator is further configured to:
        generate the peer report message when the distance from the seed server exceeds the limit distance; and
        control the message transmitter to deliver the peer report message.

2. The terminal of claim 1, further comprising:
    an uplink channel measurer configured to measure available capacity of an uplink channel of the terminal, wherein
    the message generator is further configured to generate the peer report message to additionally comprise information on the measured capacity of the uplink channel.

3. The terminal of claim 1, further comprising:
    a membership manager configured to manage a peer list; and
    a partnership manager configured to manage partnership with other terminals included in the peer list.

4. The terminal of claim 3, wherein the distance processor is further configured to:
    acquire a target distance determined by collecting a peer report message from the tracker server;
    compare a current distance from the seed server with the target distance; and
    in response to the current distance being different from the target distance, control the partnership manager to replace a partnership with one of the other peers such that the current distance is updated and is closer to the target distance.

5. The terminal of claim 4, wherein, in response to the current distance not being equal to or smaller than the target distance after the partnership replacement, the distance processor is further configured to control the membership manager to replace another membership with one of the other peers such that the current distance is equal to or smaller than the target distance.

6. The terminal of claim 3, wherein:
    the message generator is further configured to generate a membership request message to gain membership with at least one other terminal under control of the membership manager;
    the message receiver is further configured to receive a membership response message from the other terminal and processes the membership response message; and
    the membership request message and the membership response message each comprise at least one of: an ID of the seed server, an IP address of the terminal, current distance information, target distance information, and overall network prediction information.

7. The terminal of claim 6, wherein:
    the current distance information comprises at least one of: a current distance type, a current distance representation scheme, and a current distance value;
    the target distance information comprises at least one of: a target distance type, a target distance representation scheme, and a target distance value; and
    the overall network prediction information comprises at least one of: the number of terminals that have joined the network and an average capacity of an uplink channel of the overall network.

8. The terminal of claim 6, wherein in response to the network being managed according to gossip-based protocol, the distance processor is further configured to:
    infer the target distance from the seed server using information included in the membership response message;
    compare a current distance from the seed server with the target distance; and
    in response to the current distance being different from the target distance, control the partnership manager to replace a partnership with one or more other peers such that the difference between the current distance and the target distance is closer to the target distance.

9. The terminal of claim 8, wherein, in response to the current distance not being equal to or smaller than the target distance after the partnership replacement, the distance processor is further configured to control the membership manager to replace another membership with one or more of the other peers such that the current distance is equal to or smaller than the target distance.

10. The terminal of claim 3, wherein, in response to the distance of the terminal from the seed server exceeding the previously set limit distance, the distance processor is further configured to control the membership manager to change a membership by replacing at least one neighboring membership terminal with at least one terminal closer to the seed server.

11. The terminal of claim 1, wherein:
    the message receiver is further configured to receive, from the tracker server, a split notification message comprising at least one of: an ID of an old seed server, an ID of a new seed server, an IP address of the new seed server, and a ratio of membership terminals between an old network and a new network; and
    the message receiver is further configured to process the split notification message.

12. The terminal of claim 11, wherein the distance processor is further configured to operate such that the terminal is configured to:
    disconnect from the old seed server using information included in the split notification message; and
    move to a network comprising the new seed server.

13. The terminal of claim 1, wherein the message receiver is further configured to receive a split notification message comprising at least one of: an ID of an old seed server, an ID of a new seed server, an IP address of the new seed server, a ratio of terminals to be moved, and a split ratio, through gossip protocol.

14. The terminal of claim 13, wherein the distance processor is further configured to determine whether the terminal moves to the network comprising the new seed server using information included in the split notification message.

15. The terminal of claim 1, wherein the message receiver is further configured to receive, from the tracker server or from another terminal, a merge notification message comprising at least one of: an ID of an old seed server, an ID of a new seed server, an IP address of the new seed server, and a deadline, through gossip protocol.

16. The terminal of claim 15, wherein the distance processor is further configured to operate such that the terminal is configured to:
   disconnect from the old seed server; and
   move to a network comprising the new seed server, using information included in the merge notification message.

\* \* \* \* \*